United States Patent
Copeland et al.

(10) Patent No.: US 11,578,624 B2
(45) Date of Patent: Feb. 14, 2023

(54) TURBINE FOR USE WITH AT LEAST TWO WORKING FLUIDS

(71) Applicant: HIETA TECHNOLOGIES LIMITED, Bristol (GB)

(72) Inventors: Colin Douglas Copeland, Bristol (GB); Robert Ceen, Bristol (GB); Simon Lloyd Jones, Bristol (GB); Andrew Robert Jones, Bristol (GB)

(73) Assignee: HIETA TECHNOLOGIES LIMITED, Bristol (GB)

( * ) Notice: Subject to any disclaimer, the term of this patent is extended or adjusted under 35 U.S.C. 154(b) by 590 days.

(21) Appl. No.: 16/607,231

(22) PCT Filed: Apr. 28, 2018

(86) PCT No.: PCT/GB2018/051067
§ 371 (c)(1),
(2) Date: Oct. 22, 2019

(87) PCT Pub. No.: WO2018/197856
PCT Pub. Date: Nov. 1, 2018

(65) Prior Publication Data
US 2020/0263568 A1    Aug. 20, 2020

(30) Foreign Application Priority Data
Apr. 24, 2017  (GB) .................................. 1706431

(51) Int. Cl.
*F01K 23/10* (2006.01)
*F01D 13/02* (2006.01)
*F02C 6/04* (2006.01)

(52) U.S. Cl.
CPC ............ *F01K 23/101* (2013.01); *F01D 13/02* (2013.01); *F02C 6/04* (2013.01)

(58) Field of Classification Search
CPC ...... F01K 21/045; F01K 21/04; F01K 21/042; F01K 21/047; F01K 23/065;
(Continued)

(56) References Cited

U.S. PATENT DOCUMENTS

| | | |
|---|---|---|
| 3,173,241 A | 3/1965 | Birmann |
| 3,191,377 A | 6/1965 | Hiersch |

(Continued)

FOREIGN PATENT DOCUMENTS

| | | |
|---|---|---|
| CN | 101178086 | 5/2008 |
| CN | 102272444 | 12/2011 |

(Continued)

OTHER PUBLICATIONS

International Search Report for PCT/GB2018/051067, dated Jul. 20, 2018, 5 pages.
(Continued)

*Primary Examiner* — Jesse S Bogue
(74) *Attorney, Agent, or Firm* — Nixon & Vanderhye P.C.

(57) ABSTRACT

The present invention is related to a multiple-inlet turbine casing (16) for a turbine rotor (60) which comprises a first fluid supply channel (70) configured to direct a first working fluid onto the turbine rotor (60) and a second fluid supply channel (74) configured to direct a second working fluid to impart torque on the turbine rotor (60) in the same direction as the direction in which torque is imparted on the turbine rotor (60) by the first working fluid. The first working fluid is an exhaust gas from an internal combustion engine and the second fluid may be steam and the turbine may be an inverted-Brayton-cycle turbine for recovery of waste energy from the exhaust gas of said internal combustion engine. Thus, the number of turbine rotors is reduced in comparison to a system comprising a single turbine for each distinct working fluid.

22 Claims, 21 Drawing Sheets

(58) Field of Classification Search
CPC ........ F01K 23/101; F01D 13/02; F01D 5/048; F01D 9/026; F01N 5/02; F02B 37/00; F02C 3/305; F02C 6/04; F05D 2220/40; Y02T 10/12
See application file for complete search history.

(56) References Cited

U.S. PATENT DOCUMENTS

| | | | |
|---|---|---|---|
| 3,496,725 A | 2/1970 | Ferri et al. | |
| 3,726,605 A | 4/1973 | Bachl | |
| 4,653,275 A | 3/1987 | Sumser et al. | |
| 6,454,535 B1 | 9/2002 | Goshorn et al. | |
| 6,490,499 B1* | 12/2002 | Duffin | B23K 26/382 |
| | | | 700/192 |
| 9,562,442 B2* | 2/2017 | Yoshida | F01D 25/24 |
| 9,587,554 B2* | 3/2017 | Hoshi | F02B 37/025 |
| 2003/0005696 A1 | 1/2003 | Wilson | |
| 2010/0024419 A1* | 2/2010 | Pierpont | F02M 26/08 |
| | | | 60/624 |
| 2010/0229550 A1* | 9/2010 | Kuspert | F02B 37/12 |
| | | | 60/602 |
| 2010/0229551 A1* | 9/2010 | Wu | F02B 37/00 |
| | | | 60/605.1 |
| 2010/0300090 A1* | 12/2010 | Kratschmer | F02B 37/18 |
| | | | 60/602 |
| 2011/0209473 A1 | 9/2011 | Fritz et al. | |
| 2012/0260654 A1* | 10/2012 | Proepper | F01K 23/065 |
| | | | 60/607 |
| 2013/0097994 A1 | 4/2013 | Wang | |
| 2013/0121819 A1* | 5/2013 | Higashimori | F01K 7/16 |
| | | | 415/204 |
| 2013/0136590 A1 | 5/2013 | Higashimori et al. | |
| 2014/0294577 A1* | 10/2014 | Yoshida | F02C 6/12 |
| | | | 415/204 |
| 2014/0338328 A1 | 11/2014 | Lusardi et al. | |
| 2016/0167160 A1 | 6/2016 | Hellestam | |
| 2018/0371954 A1* | 12/2018 | Copeland | F02C 6/006 |
| 2020/0217212 A1* | 7/2020 | Keating | F01D 9/026 |

FOREIGN PATENT DOCUMENTS

| | | |
|---|---|---|
| DE | 1940905 | 4/1970 |
| DE | 3232318 | 4/1984 |
| DE | 3427715 | 12/1985 |
| DE | 10 2015 215 518 | 2/2017 |
| EP | 0 859 135 | 8/1998 |
| EP | 2 650 473 | 10/2013 |
| GB | 1 489 620 | 10/1977 |
| JP | 50-140722 | 11/1975 |
| JP | 52-67415 | 6/1977 |
| JP | 60-134833 | 9/1985 |
| JP | 61-38125 | 2/1986 |
| JP | 63-150033 | 10/1988 |
| JP | 11-257083 | 9/1999 |
| JP | 2005-002845 | 1/2005 |
| JP | 2009-209835 | 9/2009 |
| JP | 2009-281179 | 12/2009 |
| JP | 2009-281197 | 12/2009 |
| JP | 2012-122377 | 6/2012 |
| JP | 2015-161265 | 9/2015 |

OTHER PUBLICATIONS

Written Opinion of the ISA for PCT/GB2018/051067, dated Jul. 20, 2018, 8 pages.
Combined Search and Examination Report for GB1706431.2, dated Oct. 23, 2017, 7 pages.
Office Action for EP Application No. 18722146.0 dated Sep. 7, 2020, 6 pages.
Office Action for EP Application No. 18722146.0 dated Feb. 15, 2021, 5 pages.
Office Action for JP Application No. 2020-508088 dated Oct. 5, 2021 and English translation (18 pages).
First Office Action for CN Application No. 201880042500.8 dated Nov. 3, 2021 and English translation (24 pages).
Second Office Action for CN Application No. 201880042500.8 dated Jul. 15, 2022 and English translation (22 pages).

* cited by examiner

TURBINE FOR USE WITH AT LEAST TWO WORKING FLUIDS

This application is the U.S. national phase of International Application No. PCT/GB2018/051067 filed 24 Apr. 2018, which designated the U.S. and claims priority to GB Patent Application No. 1706431.2 filed 24 Apr. 2017, the entire contents of each of which are hereby incorporated by reference.

The present technique relates to the field of turbines.

Turbines can be used to extract work from a moving fluid. A turbine has a set of blades which are shaped so that the moving fluid imparts torque on the turbine rotor as the fluid flows across the blades. The turbine rotor can be connected via a shaft to a component to be driven by the turbine. A casing for the turbine can be used to surround the turbine to contain and direct the moving fluid.

At least some examples provide a casing for a turbine rotor comprising: a first fluid supply channel configured to direct a first working fluid onto the turbine rotor; and a second fluid supply channel configured to direct a second working fluid to impart torque on the turbine rotor in the same direction as the direction in which torque is imparted on the turbine rotor by the first working fluid, wherein the first fluid supply channel and the second fluid supply channel are arranged to direct the first working fluid and the second working fluid from separate inlets to the casing to form a co-fluent flow of first working fluid and second working fluid to be directed onto a set of turbine blades of the turbine rotor.

A least some examples provide a turbine comprising the casing as discussed above, and the turbine rotor.

At least some examples provide a computer-readable data structure representing a design of a casing as discussed above. The data structure described above may be stored on a computer-readable storage medium. The storage medium may be a non-transitory storage medium.

Further aspects, features and advantages of the present technique will be apparent from the following description of examples, which is to be read in conjunction with the accompanying drawings, in which.

Figure 1:
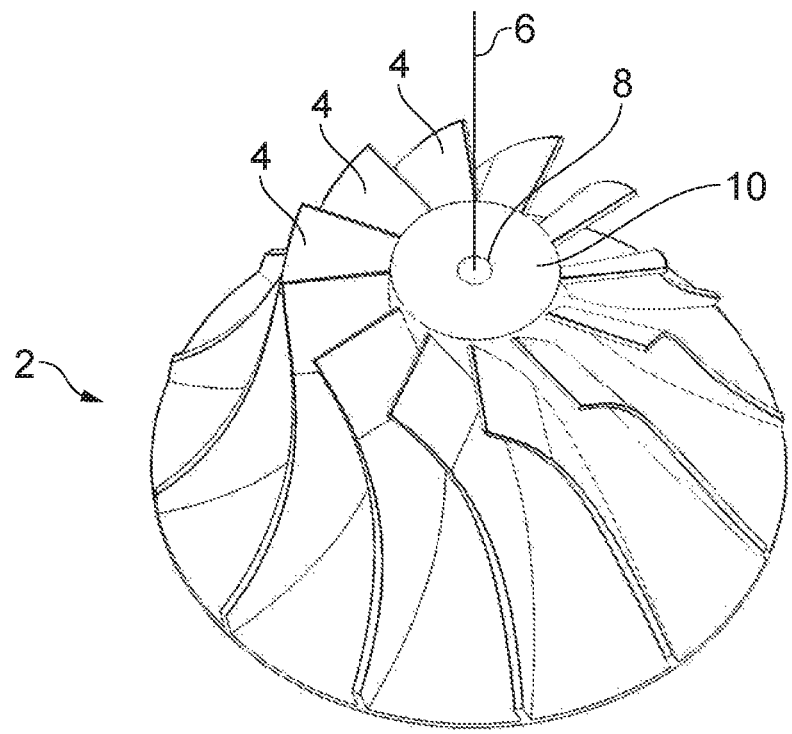
FIG. 1 shows an example of a turbine rotor.

A casing for a turbine rotor comprises a first fluid supply channel configured to direct a first working fluid onto the turbine rotor. The casing also comprises a second fluid supply channel configured to direct a second working fluid to impart torque on the turbine rotor in the same direction as the direction in which torque is imparted on the turbine rotor by the first working fluid. The first fluid supply channel and the second fluid supply channel are arranged to direct the first working fluid and the second working fluid from separate inlets to the casing to form a co-fluent flow of first working fluid and second working fluid to be directed onto a set of turbine blades of the turbine rotor.

By providing a casing in which two different working fluids enter the casing through separate inlets but form a co-fluent flow of first working fluid and second working fluid to be imparted onto a set of turbine blades of the turbine rotor, this allows two different working fluids to be at least partially mixed before they exit the casing onto the rotor. This allows a conventional turbine rotor to be used to receive two working fluids from two sources, which increases the torque in a shaft of the turbine over that seen when operating the turbine with a single working fluid. Providing a co-fluent flow of two working fluids onto a set of turbine blades for a single turbine rotor also reduces the size and the cost of the turbine compared to a turbine with two separate rotors. Also, providing two working fluids onto a single rotor allows work from both working fluids whilst reducing the complexity of managing shaft dynamics. For example, the likelihood of vibrations and the complexity of implementing bearings tends to increase with the number of devices coupled to a common shaft, so enabling two separate turbines to be replaced with a single turbine provided with a co-fluent flow of first working fluid and second working fluid while still enabling work to be extracted from both the first and second working fluids can simplify the engineering implementation of the overall system.

Also, the casing receives the first and second working fluids at separate (non-co-fluent) inlets to the casing, and combines the fluids to form a co-fluent flow prior to directing the co-fluent flow of first and second fluid onto the rotor blades. In contrast, if a turbine was implemented using a conventional casing, which receives fluid at a single inlet and directs the single flow of fluid onto the rotor, then manifolding upstream for combining the two fluids into a single flow before it reaches the turbine casing could require greater space between the turbine and other system components, making the overall system larger. With the casing described above, the first and second fluid flows can be combined within the turbine casing itself, which can increase space efficiency, which can be important for some types of engineering systems such as micro-turbines used in some automotive applications or in relatively small scale electrical power generation systems.

The first and second fluid supply channels may cause the first working fluid and the second working fluid to be co-fluent within a circumferential portion of the first fluid supply channel or the second fluid supply channel distributing the first working fluid or the second working fluid about the circumference of the turbine rotor. Hence, the first and second fluid supply channels may receive non-co-fluent flows of first and second fluids but may combine the flows and disperse the fluids about the circumference of the rotor to enable the co-fluent flow to be imparted onto the rotor at multiple points about the circumference.

The second fluid supply channel may expel the second working fluid into the first fluid supply channel. Hence, the second working fluid is injected into the flow of first working fluid within the casing before the first working fluid reaches the rotor. This allows a conventional turbine rotor with a blade shape designed for use with a single working fluid to be used to extract work from a second working fluid to provide greater torque on the rotor than if the rotor was driven by the first working fluid alone.

The second fluid supply channel may comprise a plurality of fluid guiding structures circumferentially disposed around an axis of the turbine rotor. This provides a plurality of discrete points around the circumference of the turbine rotor where the second fluid is introduced, providing greater control of jets of second fluid directed onto the rotor blades. For example, the fluid guiding structures may comprise nozzles, which provide particularly efficient control. This allows the second fluid to be accurately directed onto the rotor at a plurality of points, and the nozzle geometry can be adapted to improve turbine energy recovery for a range of flow pressures and temperatures. In order words, the fact that the secondary fluid is introduced using discrete nozzles (rather than a wider channel) allows the resultant cofluent flow of the second (or more) working fluids to be adapted to the turbine rotor blades in a manner to suit the primary flow. This allows conventional rotors to be used.

The second fluid supply channel may also comprise an annulus formed around an axis of the turbine rotor, and the annulus may direct the second working fluid into each of the nozzles. This can provide an even distribution of the second working fluid around the rotor. The annulus may have at least one second fluid inlet at which the second working fluid is supplied into the annulus, which is separate from a first fluid inlet at which the first working fluid is supplied into the casing.

The annulus may be offset from the nozzles along the axis of the turbine rotor. This reduces the circumference of the casing, therefore making it a more compact design.

At least one of the nozzles may comprise a convergent nozzle. That is, the internal diameter of the nozzle may reduce in the direction of flow. This allows the second working fluid to be directed onto the rotor, imparting more torque onto the rotor from medium pressure secondary flow.

At least one of the nozzles may comprise a convergent-divergent nozzle. That is, an internal diameter of the nozzle may be narrower at an intermediate point of the nozzle than at either end of the nozzle. This allows the second working fluid to be directed onto the rotor, imparting more torque onto the rotor from higher pressure secondary flows. Convergent-divergent nozzles may be preferred to convergent nozzles at higher pressures.

At least one of the nozzles may incorporate a metering device for controlling a flow rate of the second working fluid. This allows the flow of the second working fluid through the nozzles to be adapted to an operating condition of the rotor. For example, the metering device may alter the area of the nozzle orifice, to help provide more efficient secondary flow for a given supply quantity of second fluid.

The metering device may pulse the flow of the second working fluid. The metering device may synchronise the pulse of the flow of the second working fluid with the rotation of the turbine rotor.

The metering device may vary the secondary flow as a function of rotor rotation angle. This enables the injection of the second working fluid to occur at a suitable rotor position as it passes the nozzle and therefore increasing the amount of torque imparted onto the rotor for a given secondary flow.

The casing may also comprise a third fluid supply channel to direct a third working fluid onto the turbine rotor to impart torque on the turbine rotor in the same direction as the direction in which torque is imparted on the turbine rotor by the first working fluid and the second working fluid. This allows torque to be generated by a single rotor from three working fluids, thereby increasing the torque generated by a single rotor.

The first, second and third fluid supply channels may be arranged to direct the first, second and third working fluids from separate inlets to the casing to form a co-fluent flow of first, second and third working fluid to be imparted onto a set of turbine blades of the turbine rotor. This allows each of the working fluids to be at least partially mixed prior to imparting torque onto the rotor. For example, the second fluid supply channel may comprise a plurality of second fluid guiding structures circumferentially disposed around an axis of the turbine rotor and the third fluid supply channel may comprise a plurality of third fluid guiding structures circumferentially disposed around an axis of the turbine rotor, wherein the second and third fluid guiding structures are interleaved about the circumference of the axis of the turbine rotor. For example, the second/third fluid guiding structures could comprise nozzles (e.g. convergent or convergent-divergent nozzles) as discussed above, so that the third fluid can be supplied into the first fluid supply channel in a similar manner to the second fluid but at offset locations about the axis of the turbine rotor. The second fluid guiding structures and the third fluid guiding structures may be at the same axial position.

Alternatively, the third fluid supply channel may direct a flow of third working fluid onto the set of turbine blades of the turbine rotor, and the flow of third working fluid may be non-cofluent with the co-fluent flow of first and second working fluid at the point where the co-fluent first and second working fluid first encounters the blades. The flow of third working fluid may then become co-fluent with the first and second fluid at a later point. This allows the third working fluid to be directed onto the rotor at a specific axial location. An outlet of the third fluid supply channel may be at a different location along an axis of the turbine rotor to an outlet of the first fluid supply channel and the second fluid supply channel. For example, in some applications if the third working fluid is of lower pressure than the first/second working fluids, it may be preferred to introduce the third working fluid at a part of the turbine blades which lies further downstream along the axis than the location at which the first and second working fluids are supplied onto the blades, which could improve efficiency of extraction of work from the first and second working fluid compared to introducing the third working fluid in a co-fluent flow with the first and second working fluids.

The casing may be used with a radial turbine. This creates a more compact overall turbine structure.

A turbine may be provided comprising the casing and the turbine rotor. The turbine rotor may be a conventional (e.g. radial flow) turbine rotor designed for use with a single working fluid, as the co-fluent flow of first and second working fluid may be provided onto the rotor blades of the same shape as would be driven by a single working fluid.

The turbine may be used in a system comprising a source of primary fluid supplied to the turbine as the first working fluid, and a steam generator to generate steam supplied as the second working fluid to the turbine. For example, the first working fluid may be a gas. By enabling a single rotor to be driven by both a primary fluid and steam, this can enable greater energy to be extracted than if the rotor was driven only by the primary fluid. This can be particularly useful for an energy recovery system in which the steam generator heats water to generate the steam, based on heat extracted from either the primary fluid itself or a further fluid. For example, such energy recovery systems can be useful for an automotive system where the source of primary fluid comprises an internal combustion engine and the primary fluid comprises exhaust gas from the internal combustion engine.

In another example, a turbine rotor comprises a set of turbine blades shaped to impart torque in a predetermined direction when a first working fluid flows from a first fluid inlet portion along first fluid flow channels between the turbine blades. The rotor also comprises one or more second fluid guiding structures on the same rotor as the turbine blades, which define one or more second fluid flow channels having a different geometry to the first fluid flow channels. The second fluid guiding structures are shaped to impart torque on the turbine rotor in the same predetermined direction as the turbine blades driven by the first working fluid, when a second working fluid flows from a second fluid inlet portion separate from the first fluid in that portion along the one or more second fluid flow channels.

By providing a single rotor which extracts work from first and second working fluids supplied at separate fluid inlet portions of the rotor, the size and cost of an apparatus using the turbine can be reduced compared to systems having two separate turbine rotors on a common shaft driven by the first and second working fluids respectively. Also, using a combined rotor to extract work from both the first and second working fluids can reduce the complexity of managing shaft dynamics. For example, the likelihood of vibrations and the complexity of implementing bearings tends to increase with the number of devices coupled to a common shaft, so enabling two separate turbine to be replaced with a single turbine while still enabling work to be extracted from both the first and second working fluids can simplify the engineering implementation of the overall system.

At least part of the fluid flow channels may be disposed radially inwards or outwards from, and at the same axial position as, at least part of the first fluid flow channels. By overlapping the fluid flow channels for the first and second working fluids at the same axial position, the overall space associated with the turbine rotor can be used more efficiently than with two separate rotors mounted at different axial positions on a common shaft.

The turbine rotor may have a common exhaust region to exhaust both the first working fluid from the first fluid flow channels and the second working fluid from the second fluid flow channels. By expelling both working fluids from the turbine together, this simplifies implementation of a system including the turbine, as a single combined exhaust manifold may be used. The common exhaust region can be implemented in different ways. In some examples the first fluid flow channels and second fluid flow channels may have outlets which are side by side on the same side of the turbine rotor, and so can vent into a common exhaust pipe or conduit. In other examples, one of the first and second fluid flow channels may vent into the other. For example, the second fluid flow channels may output the second working fluid into the first fluid flow channels, where it is mixed with the first working fluid and then both fluids leave the first fluid flow channels at the common exhaust region.

The set of turbine blades may be rotationally symmetric with respect to each other, about the axis of the turbine rotor. In some embodiments, the one or more second fluid guiding structures may also be rotational symmetric about the axis of the turbine rotor. However, the set of turbine blades may be rotationally asymmetric with respect to the one or more second fluid guiding structures. Hence, the one or more second fluid guiding structures are not merely another instance of one of the turbine blades rotated about the axis, but provide a different geometry which is not merely a rotation of the geometry provided by the first fluid flow channels.

The first and second working fluids could be any fluid. For example, the fluids could be a gas, mixture of gases, liquid or mixture of liquids. For example, the fluids could be water, steam, exhaust gases from a heat engine, etc. The first and second working fluids can be of different types (e.g. exhaust gas and steam), or could be the same type of fluid but provided from two different sources. Hence, in general the first and second working fluids may be any two different flows of fluid provided separately to respective inlet regions of the rotor.

While the examples discussed below use two working fluids, a turbine rotor could also be provided with further third fluid guiding structures to be driven by a third working fluid. Hence, the first and second working fluids may be any two of three or more working fluids which are driving the same rotor.

In some examples, the turbine rotor may also have channels which allow a further fluid to flow through the turbine rotor, but in a motion which does not impart any torque in the turbine rotor. For example, a turbine rotor intended to operate at high temperatures could have cooling channels passing through the turbine blades, and cooling fluid could then be passed through those channels when the turbine is in operation, to reduce the likelihood of overheating. The arrangement of the cooling channels may be such that the cooling fluid passing through the cooling channels does not impart any torque or rotational motion on the turbine rotor. In contrast, the second fluid guiding structures may be shaped so that the second working fluid flowing through the second fluid flow channels bounded by the guiding structures does impart torque on the turbine rotor in the same direction as the torque imparted by the first working fluid flowing between the turbine blades. That is, the presence of the second fluid guiding structures and the action of the second working fluid means that the turbine rotor rotates with greater power than if it is driven by the first working fluid alone. In contrast cooling channels if provided may not provide any increased power relative to the power provided by the turbine blades driven by the first working fluid.

A number of different examples of the dual working fluid turbine rotor are described below. The second fluid guiding structures can be implemented in a number of ways.

In one example the second fluid guiding structures may comprise a further set of turbine blades which are disposed radially inward or outward from the set of turbine blades to be driven by the first working fluid. For example, the further set of turbine blades may be formed within the space at the centre of a turbine wheel which would normally be solid and connected to the shaft, but may instead be partially hollowed out and shaped with blades to be driven by the second working fluid. In this case the further set of turbine blades is radially inward from the first set of turbine blades to be driven by the first working fluid. Alternatively, a shrouded turbine wheel (in which the first set of turbine blades are formed within a shroud portion extending around the circumference of the rotor, which rotates with the rotor) could have an additional set of blades formed outside the shroud portion. In this case, the further set of turbine blades for the second working fluid may be radially outward from the set of turbine blades provided for the first working fluid. In some examples, both the first set of turbine blades and the further set of turbine blades may be radial flow turbine blades, for which the fluid flows past the blades in a radial direction (either inwards or outwards).

Alternatively, the set of turbine blades for the first working fluid may comprise radial flow turbine blades, but the further set of turbine blades could comprise rotating axial flow turbine blades disposed radially inward from the set of turbine blades for the first working fluid. With this approach, a turbine may comprise the turbine rotor together with a stator which comprises static axial flow turbine blades. The rotor and stator together form an axial flow turbine near the axis of the turbine, effectively shrouded by an additional radial flow turbine outside the axial flow turbine, so that torque is provided both by the first working fluid flowing radially along the outer radial flow turbine blades and by the second working fluid flowing axially along the inner rotating and static axial flow turbine blades. The stator may include a static flow path by which the second working fluid can be injected into the axial flow turbine along the axis of the rotor. The rotor may also include at least a portion of the flow path by which the second working fluid is supplied to the interleaved rotating/static blades of the axial flow turbine and/or an exhaust channel by which the second working fluid is exhausted from the axial flow turbine.

In another approach, rather than providing a second set of turbine blades, the second fluid guiding structures may comprise boundaries of one or more reaction-wheel channels which expel the second working fluid in a direction opposite to the predetermined direction of the torque imparted by the first working fluid on the first set of turbine blades. In use, the reaction force generating by expelling the fluid in the opposite direction from the desired rotational direction imparts additional torque in the rotational direction and so increases the power provided by the turbine.

The reaction-wheel channels may be formed within the set of turbine blades themselves, for example as internal channels running through the inside of the turbine blades and then venting at points about the circumference of the turbine rotor which are oriented to face the opposite direction from the direction of motion. If the torque imparted by the set of turbine blades is in the clockwise direction, then nozzles for expelling the second working fluid may face anti-clockwise, and vice versa. In some cases the reaction wheel channels may expel the second working fluid into the first fluid flow channels so that the second fluid is mixed with the first fluid which is flowing across the first set of turbine blades, and the first and second fluids are exhausted together from the first fluid flow channels. Alternatively, when the first fluid channels are shrouded by a shroud portion which is fixed to the turbine rotor, the reaction wheel channels may expel the second working fluid into a region outside the shroud portion of the set of turbine blades. By reducing mixing between the first and second fluids until after the first fluid has left the first fluid flow channels defined by the turbine blades, this can make fluid flow through the first fluid flow channels more efficient, to increase the amount of work extracted by the turbine.

Although some examples could form a turbine rotor from multiple separate parts, it can be useful to provide a turbine rotor which comprises an integrated mass of consolidated material which comprises both the set of turbine blades and the one or more second fluid guiding structures. Although the design of the turbine rotor may be relatively complex, it is possible to manufacture such an integrated mass of material including intricately shaped turbine blades or fluid flow channels by additive manufacturing techniques.

An apparatus may comprise a turbine comprising the turbine rotor discussed above, or the turbine comprising the rotor and stator with axial flow turbine blades as mentioned above. A first fluid supply portion may be provided to supply the first working fluid to the first fluid inlet portion of the turbine rotor, and a second fluid supply portion may supply the second working fluid to a second fluid inlet portion of the turbine rotor. The first and second inlet portions of the turbine rotor may be at different (rotationally asymmetric) positions on the turbine rotor. A common exhaust portion may be provided to output both the first and second fluids expelled from the turbine.

For example, the first fluid supply portion could comprise a first volute to inject the first working fluid into the first fluid flow channels at regions disposed around the circumference of the turbine rotor. The second fluid supply portion may comprise a second volute to inject the second working fluid into the second fluid flow channels into the regions disposed around the circumference of the turbine rotor. Where both working fluids are injected using volutes, the volutes may be disposed at different axial positions along the axis of the turbine. For example, in embodiments where one set of turbine blades is provided radially inward of a second set of turbine blades, a portion of the trailing end of the turbine wheel may extend outward, protruding beyond the region occupied by the outer set of turbine blades, and the one of the first/second fluid inlet portions corresponding to the inner set of blades may be formed on that protruding portion, to accommodate multiple volutes providing the different working fluids at different axial positions.

Alternatively, the second fluid supply portion could inject the second working fluid along an axis of the turbine rotor into the one or more second fluid flow channels. For example this approach can be useful for cases where the second working fluid flows through reaction-wheel channels as discussed above or where the inner turbine is an axial flow turbine. A seal (e.g. a labyrinth seal) may be provided at the join of the rotor and the second fluid supply portion (surrounding the axle of the turbine) to reduce leakage of the second working fluid.

The turbine discussed above can be used in any engineering system in which it is desired to extract work from two different working fluids (or two sources of the same type of working fluid).

One example of such a system may be in an apparatus comprising two or more heat engines including at least one heat engine for combusting a fuel and generating exhaust gas which comprises water as a combustion product, and an inverted Brayton cycle heat engine which comprises a turbine driven by the exhaust gas and a compressor driven by the turbine to receive and to compress the exhaust gas from the turbine. For example, such a system can be useful for recovering waste heat from the hot exhaust gases output by an internal combustion engine.

In such a system, a condenser may be located in a fluid path of exhaust gas between the inverted-Brayton-cycle turbine and the inverted-Brayton-cycle compressor, to condense at least some of the water from the exhaust gas to form condensed water. By condensing at least some of the water included as a combustion product in the exhaust gas, this reduces the mass flow through the inverted-Brayton-cycle compressor, thereby reducing the amount of work which needs to be done by this compressor in order to discharge the exhaust gas. The exhaust gas may be discharged with less work being required as increasing its pressure requires less energy due to the inherent incompressibility of the condensed water compared with increasing the pressure of the compressible exhaust gas using the inverted-Brayton-cycle compressor.

Having extracted the condensed water from the exhaust gas, the condensed water may be recirculated as a working fluid in order to extract some useful work from the condensed water. Hence, a steam-generating heat exchanger may receive the condensed water from the condenser and transfer heat to the condensed water to generate steam. The heat used to generate the steam could come from the exhaust gas itself (e.g. the exhaust gas may pass through the steam generating heat exchanger on its way to the condenser) or from another source. Having generated the steam, the steam can then be used to drive a turbine in order to extract some work.

With conventional turbine rotors, two separate turbines would be required, one to act as the inverted-Brayton-cycle turbine of the inverted-Brayton-cycle heat engine, and a second turbine to be driven by the steam generated by the steam-generating heat exchanger.

However, by using the turbine rotor, casing or turbine discussed in any of the examples in this application, the inverted-Brayton-cycle turbine may comprise a turbine rotor driven by two working fluids, the first working fluid comprising the exhaust gas from the at least one heat engine which combusted the fuel, and the second working fluid comprising the steam generated by the steam-generating heat exchanger. This allows a system for recovering energy from the exhaust gas of a fuel-combusting heat engine to be implemented more efficiently in terms of space and cost.

The turbine rotor and/or casing discussed in any of the examples in this application may be formed by additive manufacture. In additive manufacture, an article may be manufactured by successively building up layer after layer of material in order to produce the entire article. For example the additive manufacture could be by selective laser melting, selective laser sintering, electron beam melting, etc. The material used to form the turbine rotor can vary, but in some examples may be a metal or alloy, for example aluminium, titanium or steel.

The additive manufacture process may be controlled by supplying an electronic design file which represents characteristics of the design to be manufactured, and inputting the design file to a computer which translates the design file into instructions supplied to the manufacturing device. For example, the computer may slice a three-dimensional design into successive two-dimensional layers, and instructions representing each layer may be supplied to the additive manufacture machine, e.g. to control scanning of a laser across a powder bed to form the corresponding layer. Hence, in some embodiments rather than providing a physical turbine rotor the technique could also be implemented in a computer-readable data structure (e.g. a computer automated design (CAD) file) which represents the design of a turbine rotor as discussed above. Thus, rather than selling the turbine rotor in its physical form, it may also be sold in the form of data controlling an additive manufacturing machine to form such a turbine rotor (which can then be manufactured by a downstream party using their own additive manufacture machine). A storage medium may be provided storing the data structure. FIG. 1 shows an example of a turbine rotor 2 for being driven by a single working fluid.

The rotor 2 has a set of turbine blades 4 which are rotationally symmetric about an axis 6. Each pair of adjacent blades defines a fluid flow channel between them and regardless of which flow channel a given part of the fluid takes, the geometry of the flow channel is the same (but rotated about the axis 6). The rotor has a central hole 8 on the axis 6 through which an axle can be inserted. A block of material 10 surrounding the axial hole 8 is solid and can be connected to a shaft (not shown in FIG. 1). The shaft may be formed as an integral part of the turbine rotor 2 (as one mass of consolidated material), and could extend beyond the rotor on one or both of the trailing and leading faces of the rotor 2. Alternatively the shaft could be coupled to the rotor after manufacture of the rotor.

Figure 2:
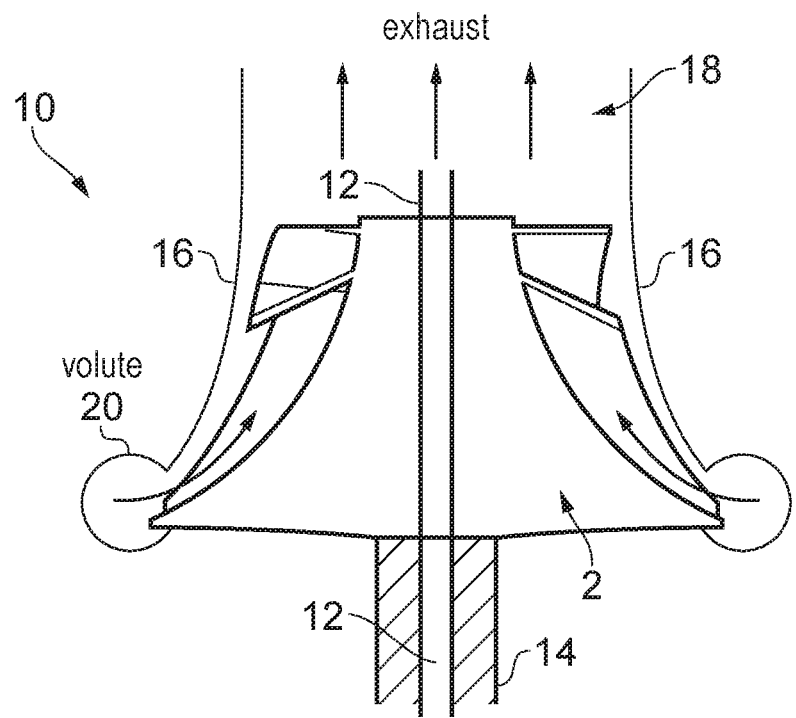
FIG. 2 shows a cross section through the turbine rotor of FIG. 1, and use of the rotor in a turbine apparatus.

FIG. 2 shows a cross section through the turbine rotor 2 when in use within a turbine apparatus 10. The rotor 2 is mounted on an axle 12 passing through the central hole 8 of the rotor 2. In this example a shaft 14 is coupled to the trailing face of the rotor 2, although in other examples the shaft could be on the leading face or on both faces, for driving other devices on either side of the turbine (such as an electric generator). The rotor 2 rotates within a static casing 16 which also forms part of the exhaust outlet 18 through which fluid is output from the turbine rotor 2. A volute 20 is provided for injecting working fluid into the channels between adjacent blades 4. The volute 20 forms a channel running about the circumference of the turbine rotor 2 near the inlet to the fluid flow channels between the blades, and is also connected to a source of working fluid at one or more points about the circumference of the volute. The volute 20 does not need to extend around the full circumference of the rotor and in some examples could be divided into multiple smaller sections. The volute 20, static casing 16 and exhaust outlet 18 may in some examples be manufactured as one integrated component, and can be manufactured separately from the rotor 2.

Hence, when the working fluid is injected into the volute 20, the working fluid passes around the circumference of the rotor and is injected into the respective fluid flow channels between the blades of the rotor 2. The working fluid passes over the blades which are shaped so that the moving fluid imparts torque on the turbine rotor in a predetermined direction. In the example of FIGS. 1 and 2 the blades are shaped so that the working fluid imparts torque in an anti-clockwise direction, but it will be appreciated that another example could flip the orientation of the blades so as to impart torque in a clockwise direction. The rotation of the rotor drives the shaft 14 which in turn drives another component connected to the shaft. The fluid leaving the channels between the blades is exhausted through the exhaust portion 18.

Figure 3:
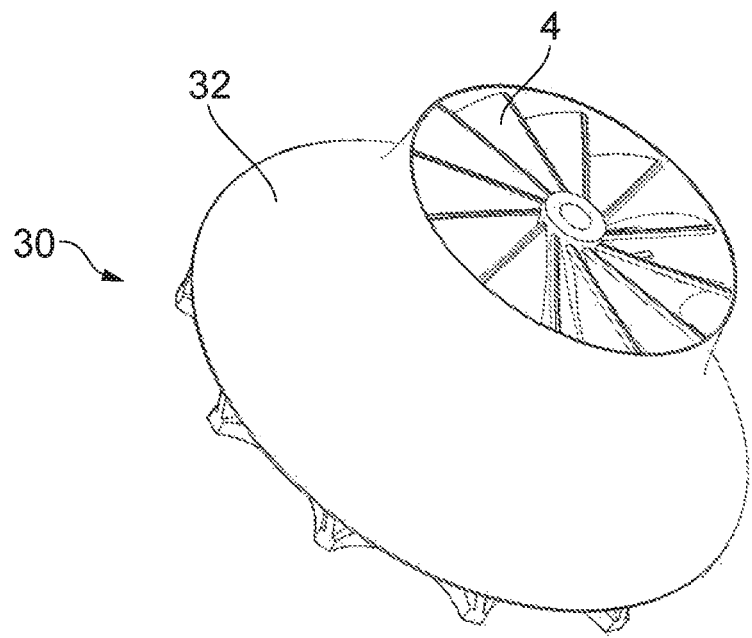
FIG. 3 shows an example of a shrouded turbine rotor.
Figure 4:
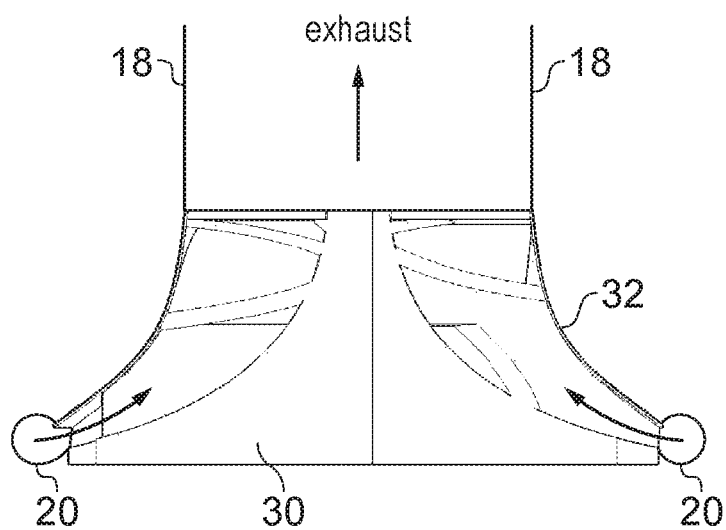
FIG. 4 shows a cross section through the shrouded turbine rotor of FIG. 3, and use of the rotor in a turbine apparatus.

FIGS. 1 and 2 show an example of an unshrouded turbine rotor. It is also possible to provide a shrouded turbine rotor 30 as shown in FIGS. 3 and 4. In the shrouded turbine rotor 30, a set of turbine blades 4 is provided in a similar way to the blades shown in FIG. 1, but in addition there is a shroud portion 32 which is fixed to the outer edge of the blades 4 and extends around the outer circumference of the turbine rotor 30. Unlike in FIG. 1 where it is possible that working fluid could escape through the gap between the edge of the blades and the static casing 16, with the shrouded rotor of FIG. 3, the shroud 32 prevents leakage of working fluid, to ensure the working fluid only escapes from the fluid flow channels at the exhaust region, which can improve efficiency of work extracted from a given mass flow rate of fluid. As shown in FIG. 4, when a shrouded turbine wheel 30 is used, then there is no need for the casing 16 to extend around a turbine rotor and instead the shrouded turbine rotor 30 may simply vent air for other working fluid into the exhaust region 18 which may not be connected to any casing surrounding the turbine rotor. As in FIG. 2, a volute 20 may inject working fluid into the fluid flow channels bounded by the turbine blades. Otherwise, the turbine is similar to the one shown in FIGS. 1 and 2.

The example shown in FIGS. 1 to 4 are radial flow turbine rotors, for which work is extracted from a working fluid which flows through the channels formed by the blades in a direction which includes a radial component moving inwards from the outer periphery of the rotor towards the axis 6 (it is also possible to provide radial flow turbines with the fluid flowing radially outwards).

Figure 5:
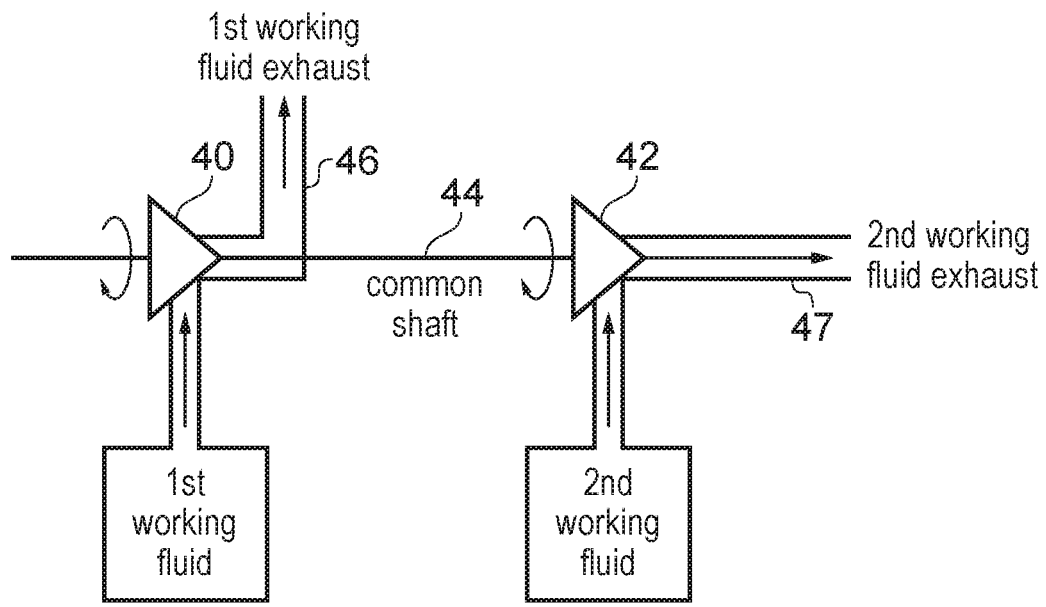
FIG. 5 shows an example of an apparatus comprising two turbine rotors driven by first and second working fluids respectively.

In some engineering systems, there may be more than one source of working fluid within the system, and it may be desired to extract work from both working fluids. FIG. 5 shows a typical approach for implementing such a system. Two turbines 40, 42 are mounted on a common shaft 44, the first turbine 40 driven by a first working fluid and the second turbine 42 driven by a second working fluid. For example the respective working fluids could be hot gases, steam, air or liquid such as water for example. However, this approach can have a number of disadvantages. Firstly the provision of two separate turbines may increase the overall space taken up by the engineering system as a whole, which may be undesirable in some applications where space efficiency may be significant problem. For example in automotive applications where the system is to fit within a tightly confined space such as under the bonnet or boot of a vehicle, space may be at a premium and so it may not be practical to provide a second turbine. Also providing two turbines increases the cost of manufacture. Also, as shown in FIG. 5 each turbine 40, 42 has a separate exhaust portion 46, 47 and so this either requires two separate exhaust outlets for the system as a whole, or requires more complicated manifolding to bring the exhaust fluid from the first and second turbines 40, 42 back together, which again increases the size of the system and the complexity and cost of building it. Another issue is that the more components are mounted on a single shaft, the more complex it becomes to balance shaft dynamics. For example, each component connected to the shaft may require bearings, and especially in systems working with hot fluids, keeping the bearings cool can be a significant problem. Hence each additional set of bearings associated with an additional turbine can increase the complexity and cost of implementing the system. Also, when more components are connected to the same shaft, then this may make it more difficult to manage vibrations.

Figure 6:
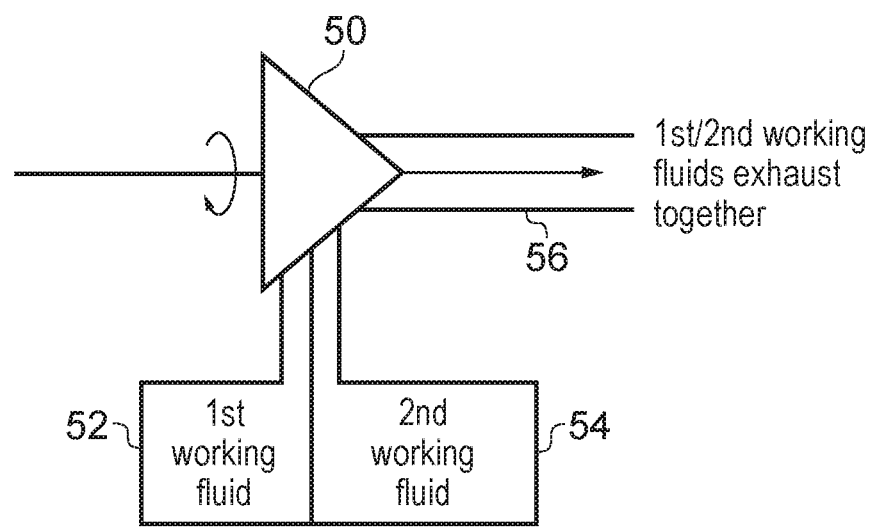
FIG. 6 shows an example of a turbine apparatus comprising a turbine rotor driven by both first and second working fluids.

As shown in FIG. 6, these problems can be reduced by providing a single combined turbine rotor 50 which is driven by both a first working fluid supplied from a first fluid supply portion 52 to a first fluid inlet region of the turbine rotor and a second working fluid supplied from a second fluid supply portion 54 to a second fluid inlet region of the turbine rotor. The turbine rotor 50 is shaped so that both the first and second working fluids impart torque on the turbine rotor in the same direction, so that work is extracted from both working fluids. Both fluids are output from a common exhaust portion 56 of the turbine apparatus. Hence, compared to FIG. 5, the size and manufacturing cost of the overall apparatus can be reduced, and the shaft dynamics can be managed more efficiently (e.g. with fewer bearings and less complexity in managing vibrations). Also as the fluids are exhausted together, a single exhaust manifold can be provided, rather than needing separate manifolds for each fluid.

FIGS. 7 to 19 illustrate five examples of a turbine rotor which could be used in the apparatus shown in FIG. 6. In each of the examples, the z axis is parallel to the axis of rotation of the rotor, and the x and y axes are perpendicular to the axis of rotation.

Figure 7:
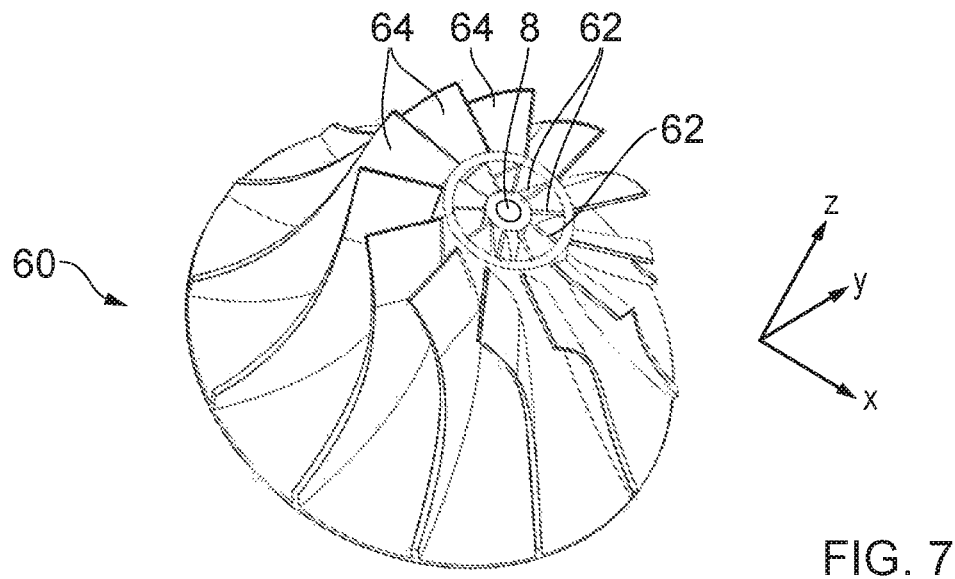
FIGS. 7 to 9 show a first example of the turbine rotor of FIG. 6.
Figure 8:
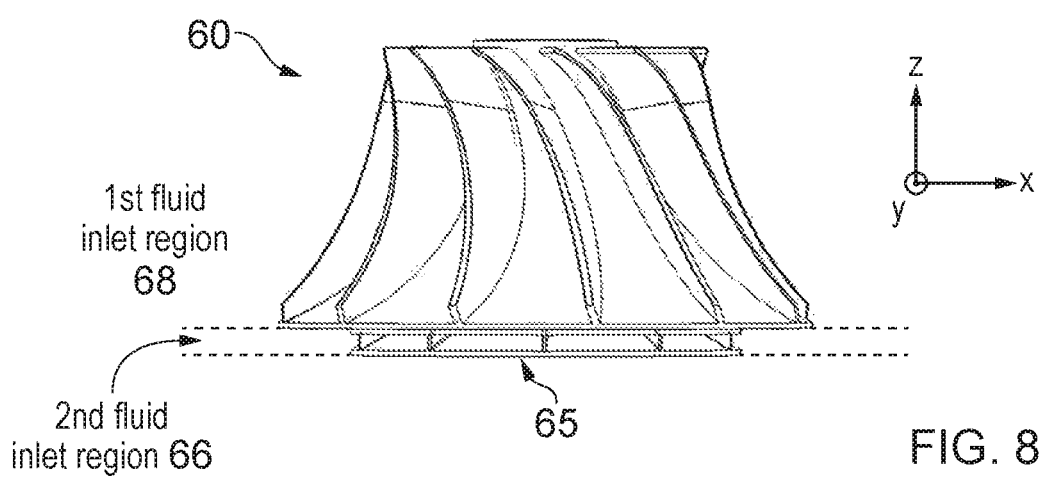
Figure 9:
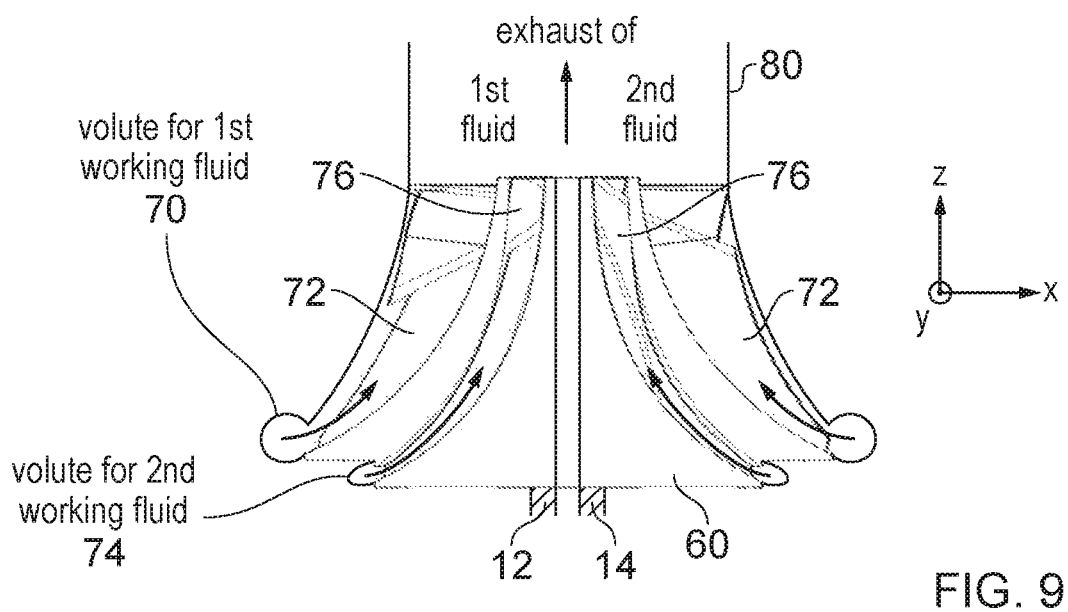

FIGS. 7 to 9 show a first example of a turbine rotor 60 for being driven by first and second working fluids. FIG. 8 shows a side view of the rotor shown in FIG. 7, when viewed along the y axis, and FIG. 9 shows a cross-section view in the x-z plane, with the plane of the cross-section passing through the hole in the centre of the rotor. As shown in FIG. 7 rotor 60 includes a second set of radial flow turbine blades 62 which are disposed radially inward of a first set of radial flow turbine blades 64 for being driven by the first fluid. In this example, the first set of turbine blades 64 have a similar profile as shown in the example of FIG. 1, although they could also have a different profile. The second set of turbine blades 62 are formed in the region which is solid 10 in FIG. 1. Hence the second set of turbine blades form second fluid flow channels, and when the second working fluid flows through these channels they flow against the second set of blades 62 imparting torque on the rotor 60 in the same direction as the direction of torque imposed by the first set of blades 64 when driven by the first working fluid. In the example of FIG. 7, the direction of the torque is anticlockwise but other examples could provide a clockwise rotating rotor 60.

As shown in FIG. 8, an inner portion 65 on the trailing face of the turbine rotor 60 protrudes out beyond the outer edges of the trailing face, to define a second fluid inlet region 66 which is disposed axially behind the first fluid inlet region 68. As shown in the cross-section view of FIG. 9, when the rotor is in use within a turbine system, a first volute 70 may be disposed around the first fluid inlet region 68 to inject first fluid into the first fluid flow channels 72 between the respective blades 64 of the first set of blades, so that the first fluid imparts torque on the rotor. A second volute 74 may be disposed around the second fluid inlet region 66 to inject a second working fluid through the second fluid flow channels 76 between the second set of turbine blades 62. Hence, the second fluid flows from the second volute 74 through the channels 76 and flows against the second set of blades to impart torque in the same direction as the direction of rotation motion imposed by the first fluid. The first and second fluid flow channel 72, 76 vent side by side into an exhaust portion 80 of the turbine and then can be output together through a common exhaust manifold. In this example, the inner flow path for the second working fluid is effectively shrouded by the outer flow path for the first working fluid. Portions of the first and second fluid flow channels are disposed at different radial positions but the same axial position. As the second set of turbine blades 62 is formed within the portion that would otherwise be solid in the turbine wheel of FIG. 1, the provision of the second set of blades does not require any additional space, and helps reduce the mass of the turbine, improving space efficiency for systems using such a turbine and reducing manufacturing costs.

Figure 10:
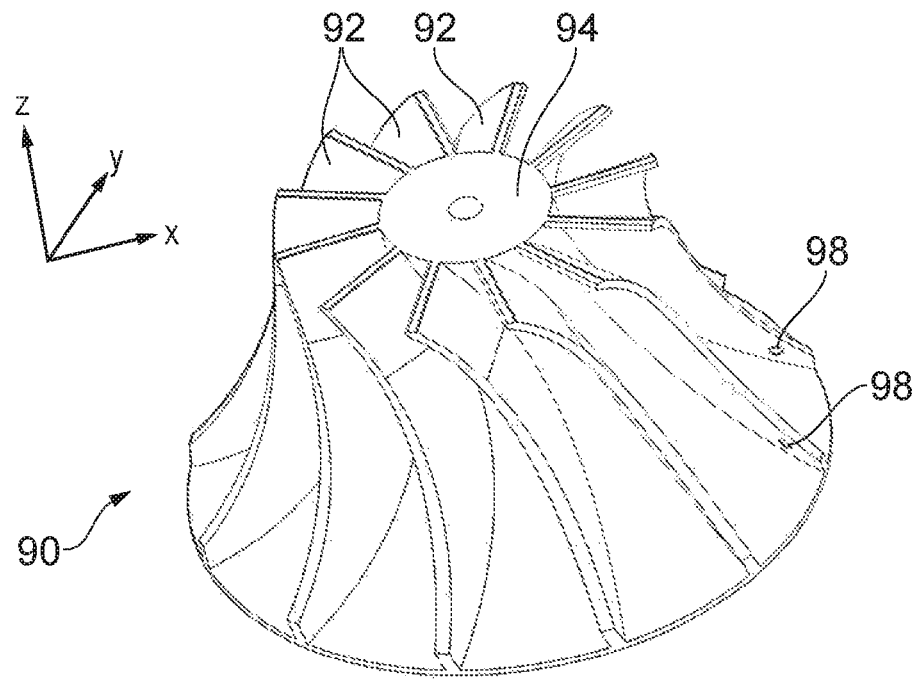
FIGS. 10 to 12 show a second example of the turbine rotor of FIG. 6.
Figure 11:
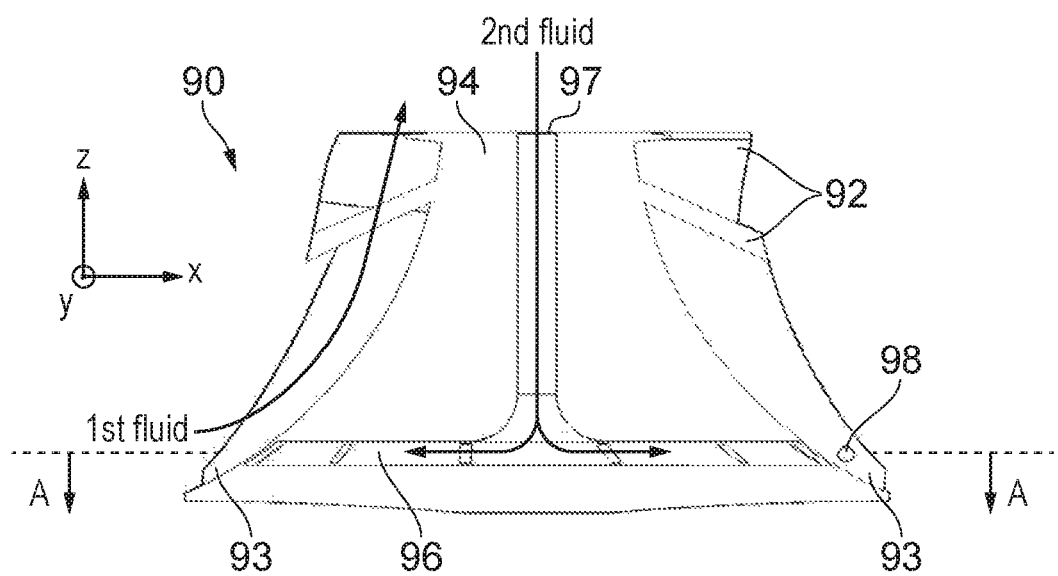
Figure 12:
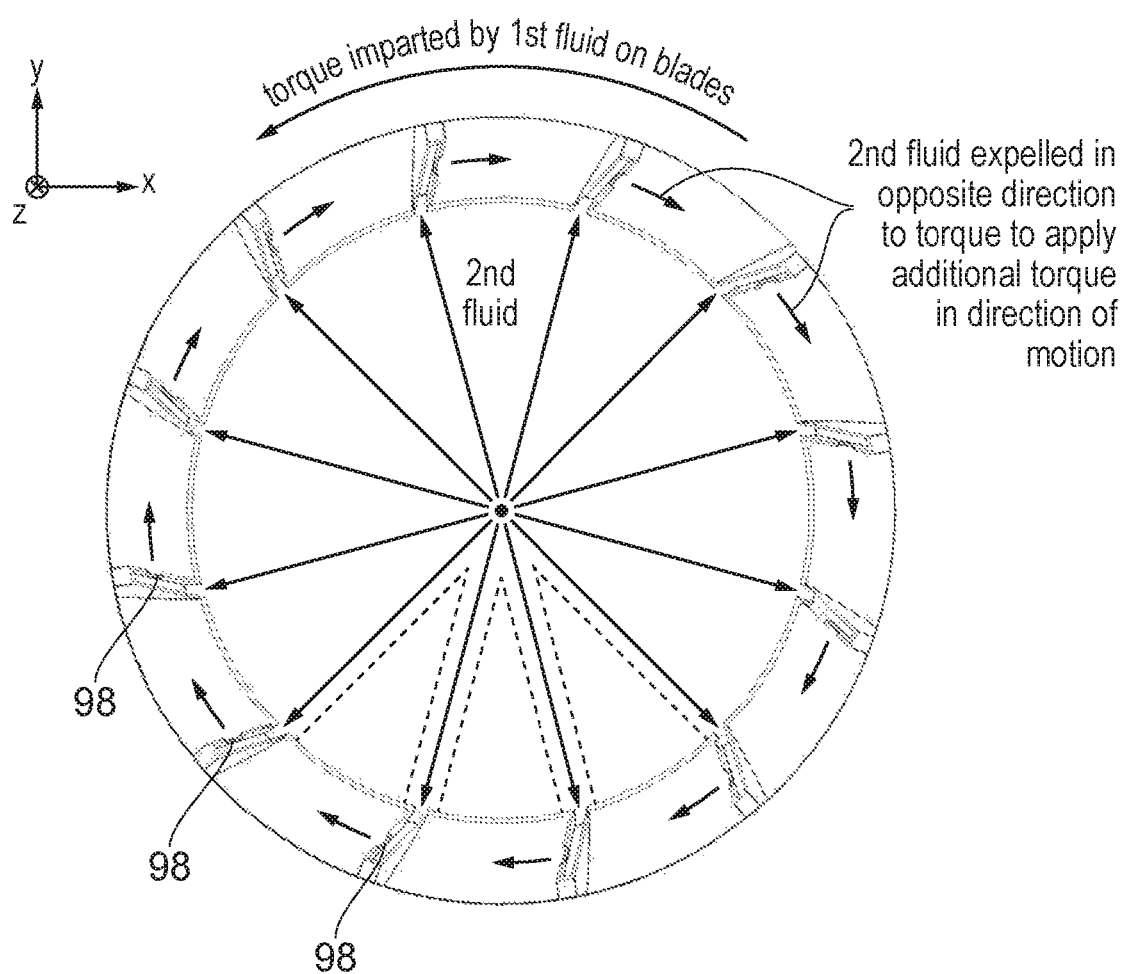

FIGS. 10 to 12 show a second example of a dual working fluid turbine rotor 90 which can be used in the example of FIG. 6. FIG. 11 shows a cross-section in the x-z plane, with the plane passing through the central hole in the centre of the rotor. FIG. 12 shows a cross-section view in the x-y plane at the location marked A-A in FIG. 11. The rotor 90 includes a first set of turbine blades 92 similar to the blades 64 in FIG. 7. The first working fluid is supplied at a first fluid inlet region 93, e.g. from a volute as in the example of FIG. 9.

In this example, the central portion 94 inside the blades and surrounding the axial hole is mostly solid, similar to the central portion 10 in FIG. 1. However, as shown in the cross-section view of FIG. 11, a set of reaction-wheel channels 96 are formed inside the central solid portion 94 of the rotor. The solid boundaries of the reaction-wheel channels 96 are an example of second fluid guiding structures, and the reaction-wheel channels 96 are an example of second fluid flow channels.

The reaction-wheel channels 96 take in second fluid from a second fluid inlet portion 97 on the axis of the rotor 90. For example, the second working fluid can be injected through a tube surrounding the axle about which the rotor rotates. A labyrinth seal (not shown in FIG. 11) can be used to reduce leakage of the second working fluid (similar to the seal shown in the third rotor example in FIGS. 13-15 discussed below).

The second working fluid passes along the axis, and is then distributed towards nozzles 98 located in the respective blades 92 of the first set of turbine blades. Each nozzle is located on the side of the blade 92 facing away from the direction of rotational motion imparted by the first working fluid. In the example of FIGS. 10-12, the direction of motion is anti-clockwise, and so the nozzles are located on the clockwise-facing surface of each blade, to expel the second working fluid in a clockwise direction. The reaction force (thrust) caused by expulsion of air in the clockwise direction causes additional torque to be applied in the anti-clockwise direction, so that the rotor 90 provides greater torque than would be achieved from the blades 92 alone. The nozzles 98 expel the second working fluid into the same fluid flow channels taken by the first working fluid passing across the blades 92, so that both the first and second working fluids are exhausted from a common exhaust region of the turbine. In embodiments where the blades driven by the first working fluid are shaped to provide torque in the clockwise direction, the nozzles 98 would instead be located on the anti-clockwise facing surfaces of the blades 92 to expel fluid in the anti-clockwise direction.

In the example of FIGS. 11 and 12, the central part of the reaction-wheel channels 96 along the axis of the rotor opens out into a disc-shaped region with a wider cross-section, which directs the second working fluid to the nozzles 98 in each blade. It would also be possible for separately defined channels to extend out radially from the axis to each nozzle 98 (with solid regions between the separate channels as shown in the dotted lines in FIG. 12).

Hence, this provides another technique for extracting work from a second working fluid in a rotor already being driven by a first working fluid.

Figure 13:
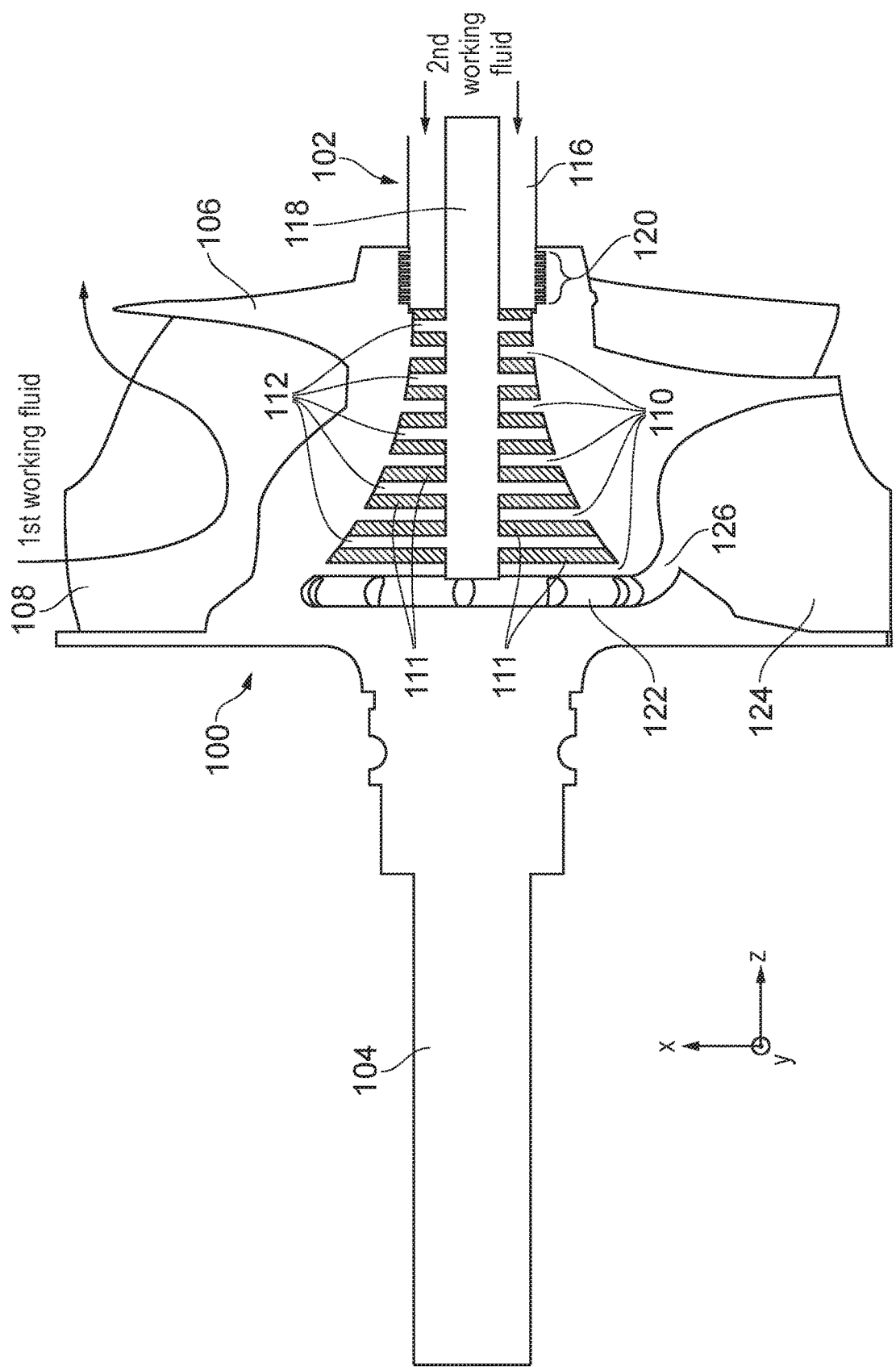
FIGS. 13 to 15 show a third example of the turbine rotor of FIG. 6.
Figure 14:
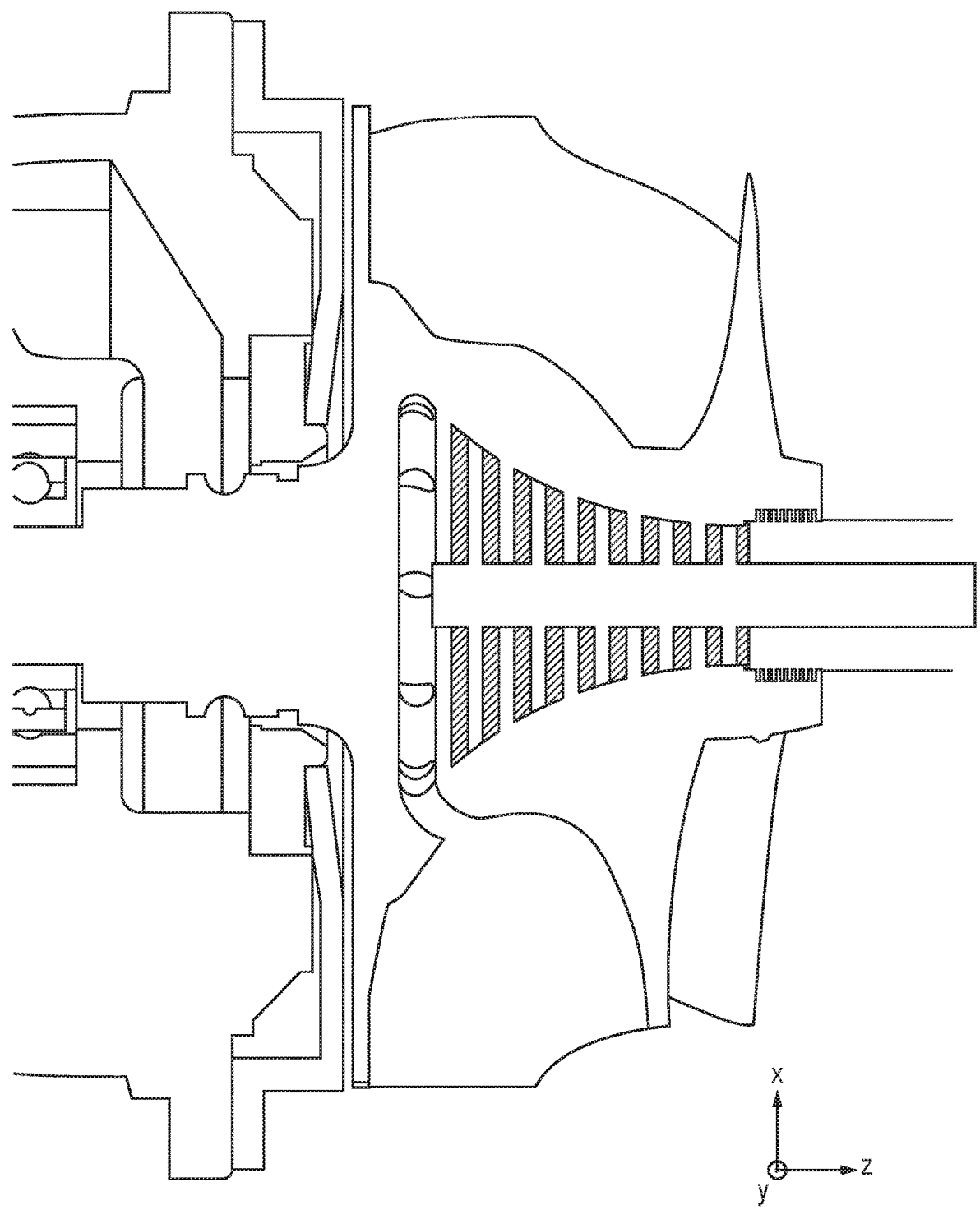
Figure 15:
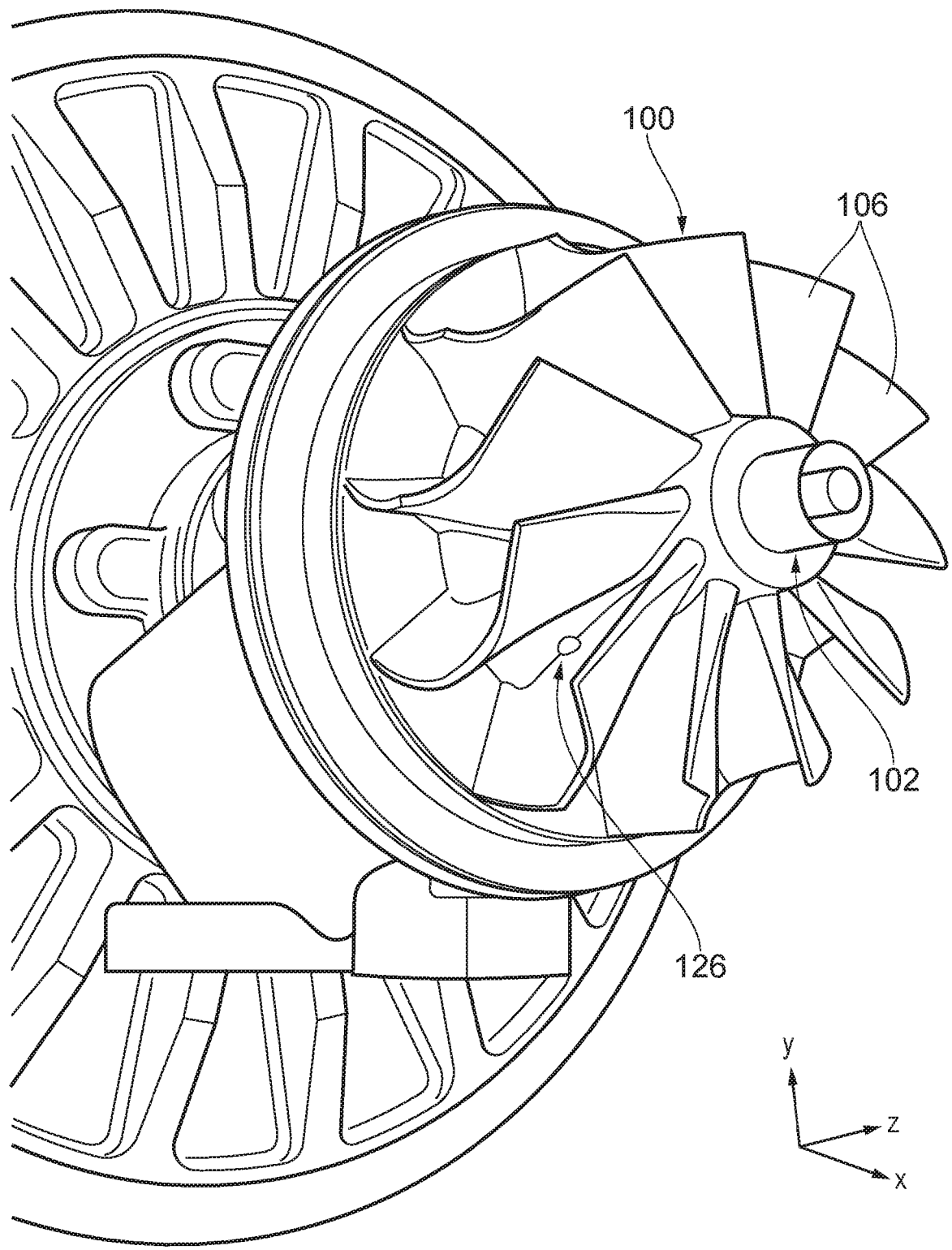

FIGS. 13 to 15 show a third example of a dual working fluid turbine. In this example, an axial flow turbine is formed inside a radial flow turbine on the same turbine rotor. As shown in FIG. 13, turbine includes a rotor 100 and a stator 102. In operation the rotor 100 rotates about the stator 102. The rotor 100 is integrally formed with a shaft 104 and comprises a first set of radial flow turbine blades 106 which are shaped to impart torque on the rotor when a first working fluid is injected from the first fluid inlet region 108 on the outer circumference of the rotor. The first working fluid flows through the channels formed by the turbine blade 106 and exhausts from the leading face of the turbine. FIG. 15 shows another view of the turbine where the radial flow turbine blades 106 can be seen more clearly. FIG. 14 shows a view of the turbine with the shaft connected to a bearing and to the equipment to be driven by the turbine.

As shown in FIGS. 13 and 14 the rotor includes a set of rotating axial flow turbine blades 110 which are formed radially inward from the first set of turbine blades about the axis of the rotor. The rotating axial flow turbine blades 110 are interleaved with corresponding static axial flow turbine blades 112 formed on the stator which remains static as the rotor rotates about the stator 102, with gaps 111 in between the rotating blades 110 and static blades 112 (the gaps are shown shaded in FIGS. 13 and 14). The rotating and static blades 110, 112 together form an axial flow turbine which is driven by second working fluid which is injected along the axis through a second fluid supply portion 116 provided in the stator 102 in a portion surrounding the axle 118 on which the rotor rotates.

A labyrinth seal 120 is formed in the portion where the second fluid supply portion 116 meets the rotor 100. In the labyrinth seal 120, the rotor 100 and second fluid supply portion 116 have interlocking portions. The shape of the interlocking portions means that, for the second working fluid to escape out at the leading face of the rotor instead of passing down the axial flow turbine, the fluid would have to traverse a tortuous path (in and out of the interlocking parts), reducing the chance of leakage of the second working fluid, and improving efficiency of work extraction.

Also, a second fluid exhaust channel 122 is formed within the rotor 100 which receives the second working fluid output from the axial flow turbine and expels the second working fluid into the first fluid flow channels 124 formed between adjacent blades 106 of the first set of turbine blades. One of the outlet holes 126 for expelling the second working fluid can be seen in the view shown in FIG. 15 as well as in FIG. 13.

Hence, in operation the first working fluid is injected at a first fluid inlet region 108 which extends around the circumference of the first set of turbine blades (e.g. the fluid can be injected with a volute), and drives the turbine to impart torque in a given direction. Meanwhile the second working fluid is injected along the axis and drives the axial flow turbine formed in the centre of the turbine to provide additional torque in the same direction as that provided by the first set of turbine blades. The second working fluid is exhausted along with the first working fluid, since the exhaust channel 122 outputs into the same channels taken by the first working fluid. Again, this approach requires little additional space compared to a conventional turbine rotor with radial flow turbine blades being driven by a single working fluid. While FIG. 13 shows an example where the second working fluid is injected from the leading face of the turbine, it would also be possible to inject the second working fluid from the trailing face.

Figure 16:
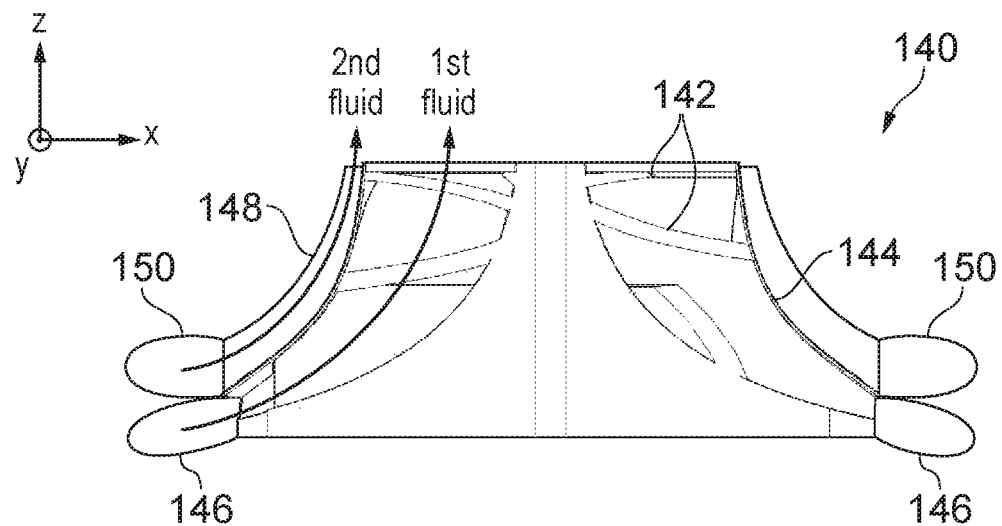
FIGS. 16 and 17 show a fourth example of the turbine rotor of FIG. 6.
Figure 17:
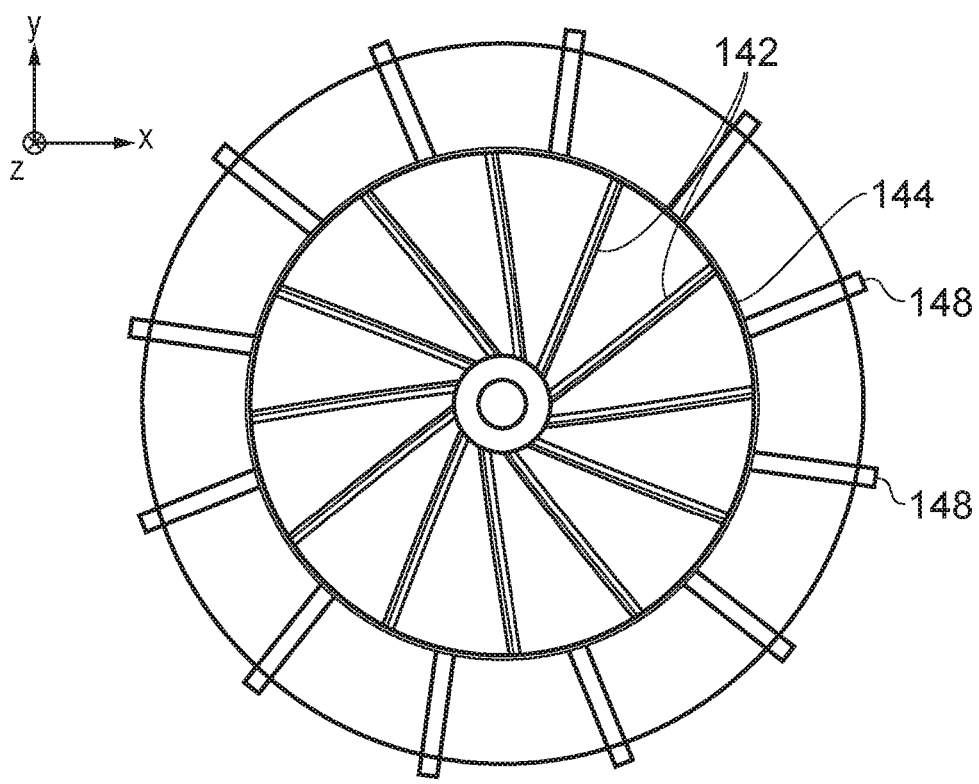

FIGS. 16 and 17 show a fourth example of a turbine rotor 140 which can be used in the example of FIG. 6. FIG. 16 shows a cross-section in the x-z plane and FIG. 17 shows a cross-section in the x-y plane. In this example, the first set of blades 142 are shrouded by a shroud portion 144 similar to the shroud 32 of FIGS. 3 and 4. The first working fluid is supplied from a first volute 146, flows through the channels formed by the blades 142 to impart torque on the rotor, and is expelled at an exhaust region at the leading face of the rotor.

A second set of turbine blades 148 is formed outside the shroud portion 144. As shown in FIG. 17, the second set of turbine blades 148 can have a different number of blades and a different pitch (spacing between the blades) to the first set of blades 144, depending on design requirements. The second working fluid is supplied from a second volute 150, flows through the channels formed by the second set of blades 142 to impart torque on the rotor in the same direction as the torque applied by the first working fluid, and is exhausted from the rotor at the same side of the rotor as the first working fluid, so that a common exhaust manifold can gather and output both the first and second working fluid. Hence, in contrast to FIG. 7 where the second set of blades is provided radially inward from the first set of blades, in FIG. 16 the second set of blades is radially outward from the first set of blades.

Figure 18:
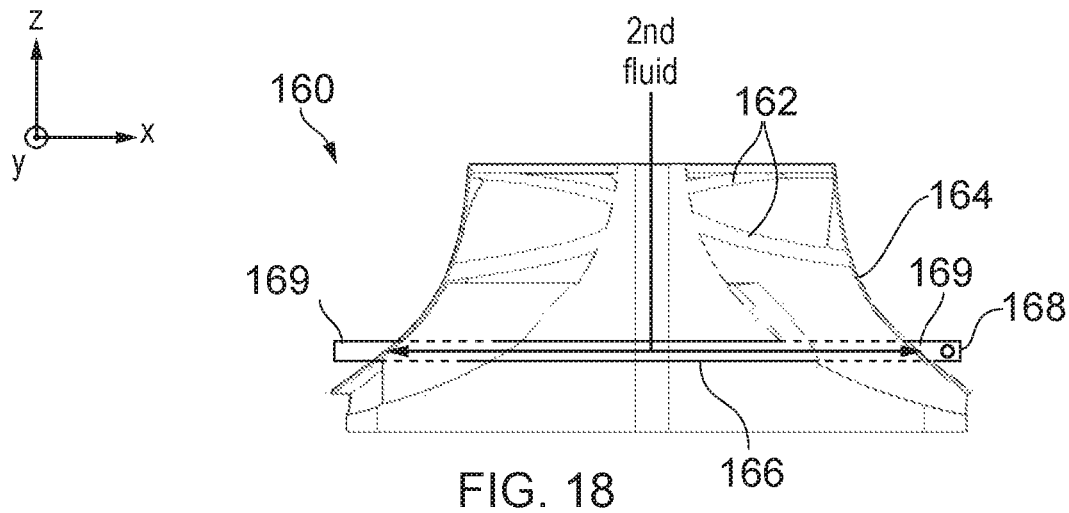
FIGS. 18 and 19 show a fifth example of the turbine rotor of FIG. 6.
Figure 19:
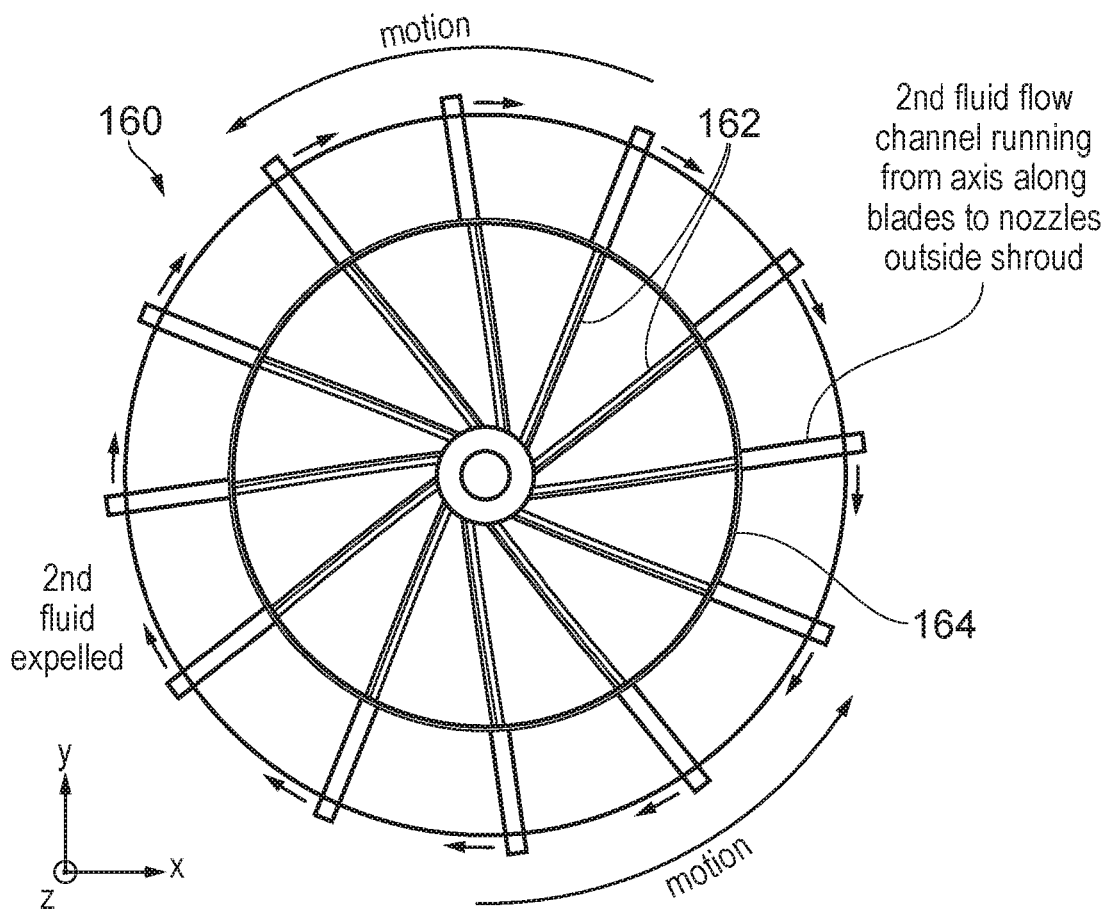

FIGS. 18 and 19 show a fifth example of a turbine rotor 160 which can be used in the example of FIG. 6. FIG. 18 shows a cross-section in the x-z plane and FIG. 19 shows a cross-section in the x-y plane. As in FIG. 16, the first set of blades 162 comprise a shrouded set of blades shrouded by a shroud portion 164, which function in a similar way to the blades of FIG. 16. However, the fifth example is similar to the reaction-wheel example of FIGS. 10-12, in that reaction-wheel channels 166 are formed in the central portion of the wheel to receive second working fluid injected along the axis of the rotor and provide the second working fluid to a set of nozzles 168 which expel the second working fluid in the opposite direction to the direction of rotational motion imparted by the first working fluid on the blades 162. Unlike in FIG. 10, with the example of FIGS. 18 and 19, the nozzles are located outside the shroud portion 164. The reaction wheel channels extend out through the blades to protruding portions 169 which jut out beyond the shroud portion 164. Again, in this example the motion is in the anti-clockwise direction, and so the nozzles 168 are in the clockwise-facing surfaces of the protruding portions 169, but in another example the direction of motion could be clockwise and then the nozzles could face anti-clockwise. As in FIG. 10, the expulsion of second working fluid in the opposite direction to the direction of motion provides additional torque in the same direction as the direction of torque imparted by the first working fluid, to extract additional work from the second working fluid and provide greater torque.

The examples of turbine rotors discussed above can be used in any system where work is to be extracted from both a first working fluid and a second working fluid.

Figure 20:
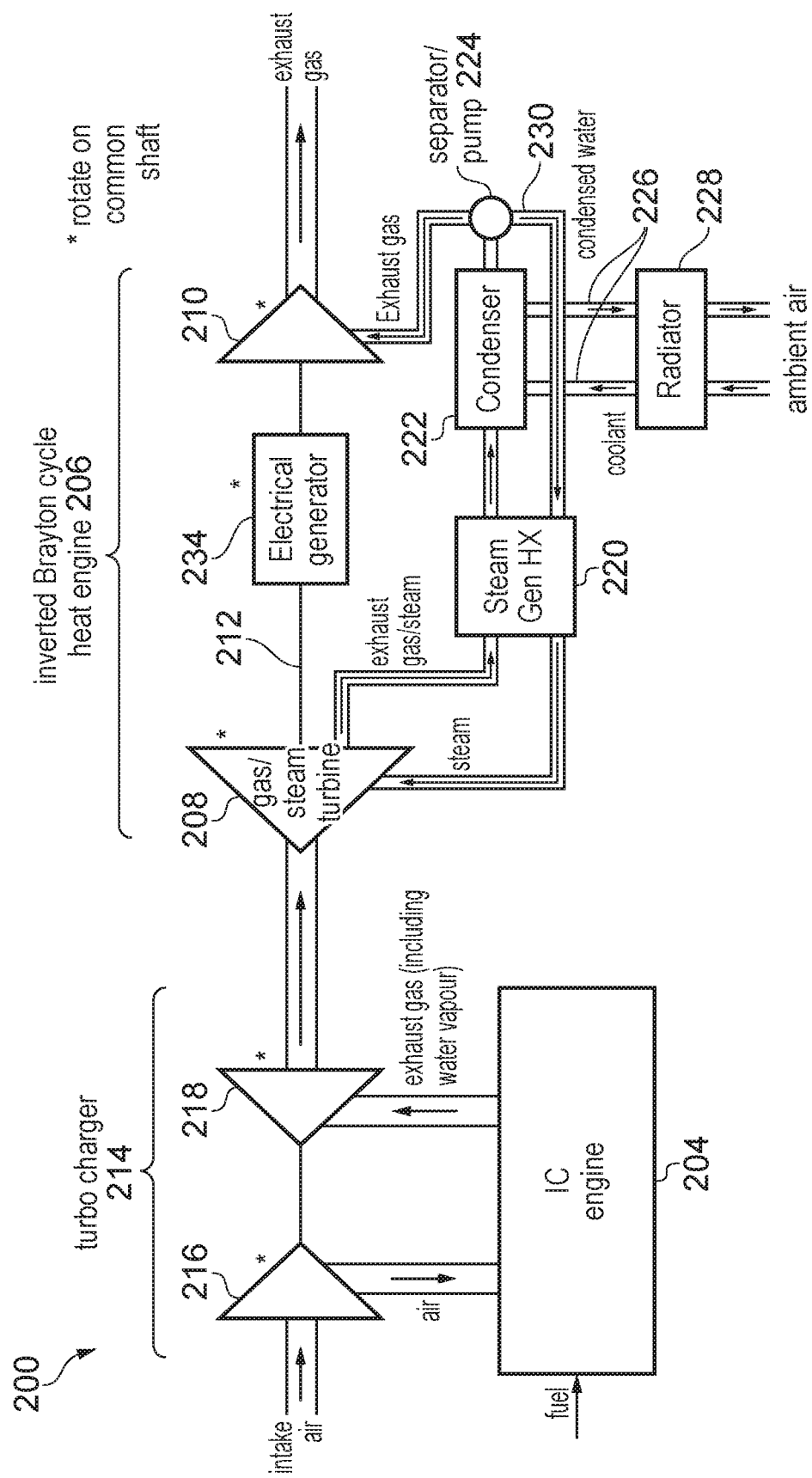
FIG. 20 shows an apparatus comprising two or more heat engines, including an inverted Brayton cycle heat engine comprising a combined gas/steam turbine for which the first and second working fluids comprise exhaust gas from an internal combustion engine and steam.

FIG. 20 shows an example of a system using such a turbine (it will be appreciated many other use cases for a dual-working fluid turbine are also possible). FIG. 20 schematically illustrates an apparatus 200 comprising a plurality of heat engines. These heat engines include an internal combustion engine 204 and an inverted Brayton cycle heat engine 206 including an inverted-Brayton-cycle turbine 208 and an inverted Brayton-cycle compressor 210 mounted on a common shaft 212. The internal combustion engine 204 has a turbo charger 214 including a turbo charger compressor 216 and a turbo charger turbine 218. In operation, intake air is compressed by the turbo charger compressor 216 and is mixed with fuel within the internal combustion engine 4 to drive the internal combustion engine 204 and to generate hot exhaust gas which passes through the turbo charger turbine 218 before entering the inverted Brayton cycle heat engine 206. The turbo charger compressor 216 and the turbo charger turbine 218 are mounted on the common shaft 212, (and could be a common part for part count reduction within a system) which also carries the inverted-Brayton-cycle turbine 208 and the inverted-Brayton-cycle compressor 210.

In other example embodiments the turbo charger 214 and the inverted-Brayton-cycle heat engine 206 need not share a common shaft.

The hot exhaust gas entering the inverted Brayton cycle heat engine 206 contains water as a combustion product from the combustion of the fuel (e.g. petrol, diesel, LPG, LNG or combinations thereof) and air by the internal combustion engine 204. The exhaust gas drives the inverted-Brayton-cycle turbine 208 and exits therefrom at a reduced pressure, e.g. below atmospheric pressure. The exhaust gas follows along a fluid path between the inverted- Brayton-cycle turbine 208 and the inverted-Brayton-cycle compressor 210. This fluid path passes through a steam-generating heat exchanger 220 and a condenser 222. The condenser 222 serves to condense water from the exhaust gas to form condensed water (i.e. liquid water). A separator/pump 224 serves to separate the condensed water from the exhaust gas (e.g. using inertial separation), raise its pressure (using relatively little energy due to the incompressibility of the liquid water) and supply the condensed water to a recirculation path 230. The exhaust gas without the condensed water has a reduced mass flow rate. The exhaust gas without the condensed water passes through the inverted-Brayton-cycle compressor 210 which raises its pressure to a point where it may be exhausted to, for example, the atmosphere. The condenser 222 is supplied with a circulating flow of coolant 226 which is maintained at a temperature substantially corresponding to the ambient air temperature surrounding apparatus 200 by a radiator 228. The circulating flow of coolant 226 is separate from the recirculation path 230. The circulation flow of coolant 226 forms a closed loop path (with no opening into the fluid path taken by the exhaust gas through the inverted-Brayton-cycle turbine 208 and inverted-Brayton-cycle compressor 210).

The recirculation path 230 from the separator/pump 224 supplies the condensed water to the steam-generating heat exchanger 220 where it is heated by the exhaust gas passing through the inverted Brayton cycle heat engine to generate steam. This steam is supplied to the inverted-Brayton-cycle turbine 208 as a second working fluid (the exhaust gas being the first working fluid). The combined gas/steam turbine 208 has a rotor according to any of the examples described above, and so extracts work from both the gas and steam, to increase the amount of electrical energy that can be generated by an electrical generator 234.

In operation, the internal combustion engine 204 combusts fuel mixed with the intake air to extract work therefrom and generates hot exhaust gas containing water. The inverted Brayton cycle heat engine 206 serves to extract work from the hot exhaust gas which is used to drive an electrical generator 234, which is also mounted on the common shaft 212. Furthermore, the condenser 222 extracts water from the exhaust gas to form condensed water into which the steam-generating heat exchanger 220 transfers heat energy to generate steam that also drives the inverted-Brayton-cycle turbine 208 and contributes to driving the electrical generator 234 to generate electrical energy.

Figure 21:
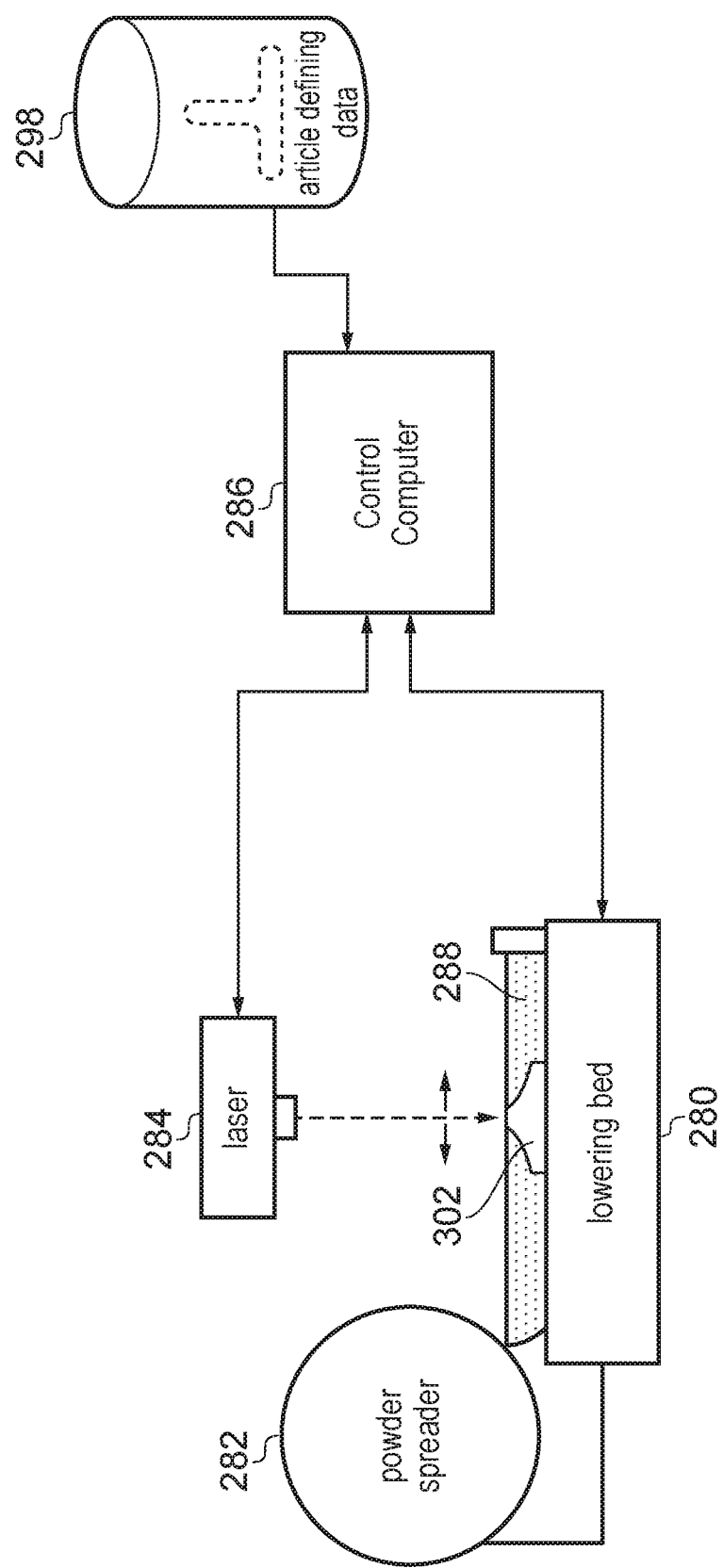
FIG. 21 shows an apparatus for manufacturing a turbine rotor using additive manufacture.

FIG. 21 schematically illustrates additive manufacture. In this example, laser fused metal powder 288 is used to form an article 302 such as the turbine rotor described above. The article 302 is formed layer-by-layer upon a lowering powder bed 280 on top of which thin layers of metal power to be fused are spread by a powder spreader 282 prior to being melted (fused) via a scanning laser beam provided from a laser 284. The scanning of the laser beam via the laser 284, and the lowering of the bed 280, are computer controlled by a control computer 286. The control computer 286 is in turn controlled by a computer program (e.g. computer data defining the article 302 to be manufactured). This article defining data is stored upon a computer readable non-transitory medium 298. FIG. 21 illustrates one example of a machine which may be used to perform additive manufacture. Various other machines and additive manufacturing processes are also suitable for use in accordance with the present techniques, whereby a turbine rotor is manufactured with a set of turbine blades and second fluid guiding structures as discussed above.

Figure 22:
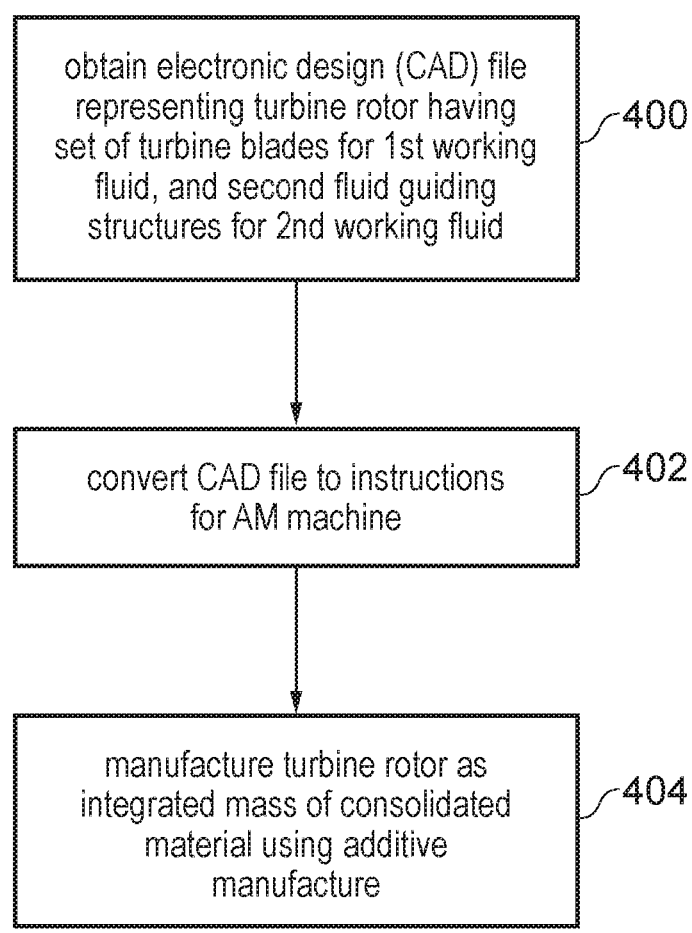
FIG. 22 shows a method of manufacturing a turbine rotor.

FIG. 22 shows a method for manufacturing a turbine rotor. The turbine rotor may be a component made separately from other parts of the turbine and can be sold as a standalone product (even if another component such as the stator would be needed to form the overall turbine). At step 400 a computer automated design (CAD) file is obtained. The CAD file provides a data structure which represents the design of a turbine rotor having a set of turbine blades for being driven for a first working fluid and second fluid guiding structures for guiding a second working fluid to provide torque in the same direction as the first working fluid. For example, obtaining the CAD file at step 400 may comprise a designer generating a three-dimensional (3D) model of the turbine rotor from scratch, or could comprise reading an existing design from a recording medium or obtaining the CAD file via a network. The design file may represent the 3D geometry to be manufactured.

At step 402 the CAD file is converted to instructions for supplying to an additive manufacturing machine. The instructions control the additive manufacturing machine to deposit or form respective layers of material, which are built up layer by layer to form the overall turbine rotor. For example, the 3D design represented by the CAD file may be sliced into layers each providing a two-dimensional representation of the material to be formed in the corresponding layer.

At step 404 the converted instructions are supplied to an additive manufacturing machine which manufactures the turbine rotor using additive manufacture. The turbine rotor can be made from various materials, e.g. metals or alloys, such as titanium or stainless steel, or a polymer for example. Various forms of additive manufacturing can be used, but in one example the additive manufacture uses selective laser melting.

In the examples given above, the turbine rotor comprises first/second fluid guiding structures so that the same rotor can be driven with two sources of working fluid.

Another way of enabling the same turbine rotor to be driven with two independent sources of working fluids can be to provide a turbine casing which receives the first and second working fluids at separate non-co-fluent inlets, and combines the flow of first/second working fluid within the casing to form a co-fluent flow of first and second working fluid which is directed onto the turbine rotor. With this approach, a conventional turbine rotor of the form shown in FIGS. 1 and 2 could be used with the casing, which has blades designed for use with a single working fluid.

Figure 23:
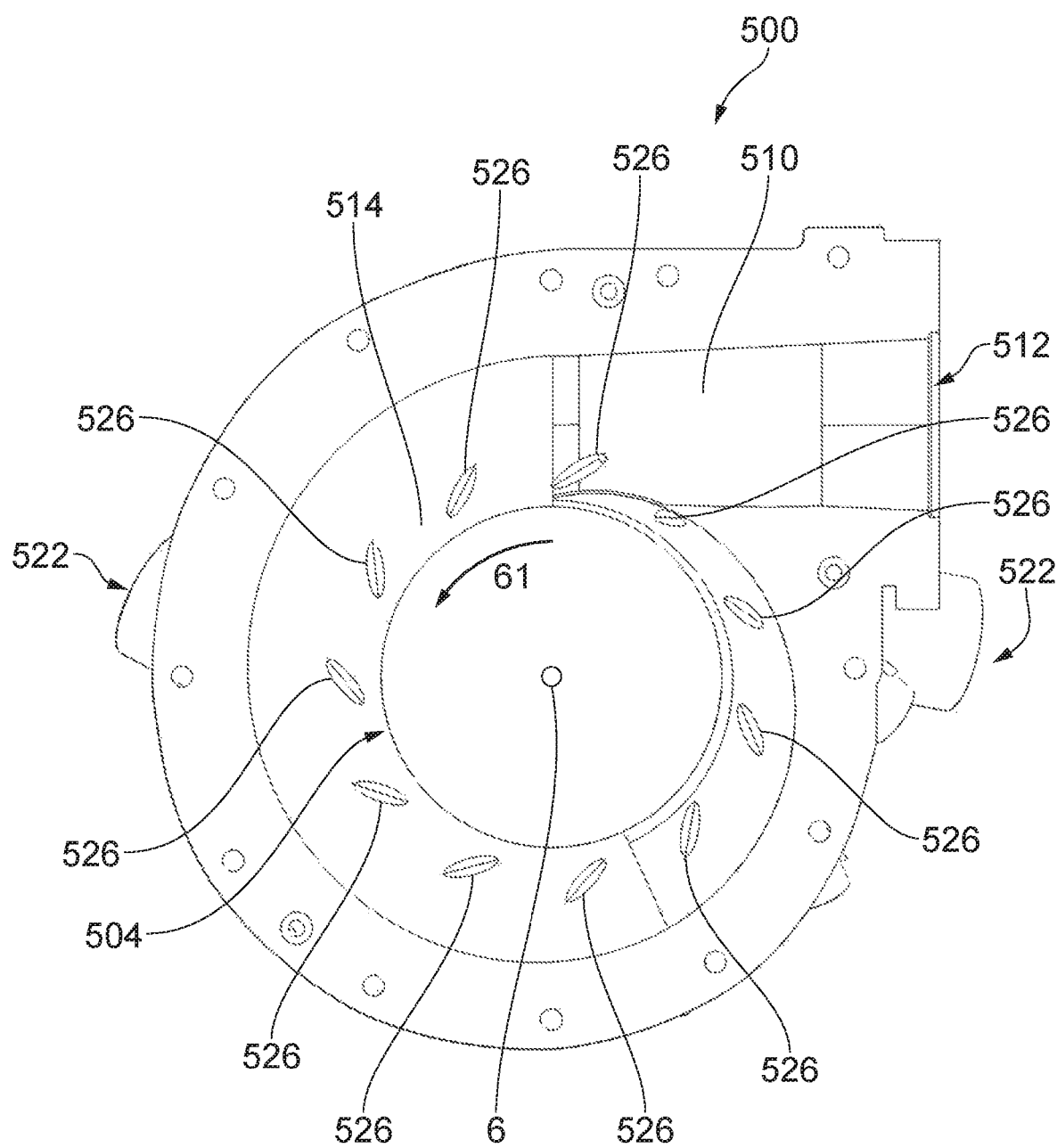
FIGS. 23 to 26 show different views of an example of a casing for a turbine rotor.
Figure 24:
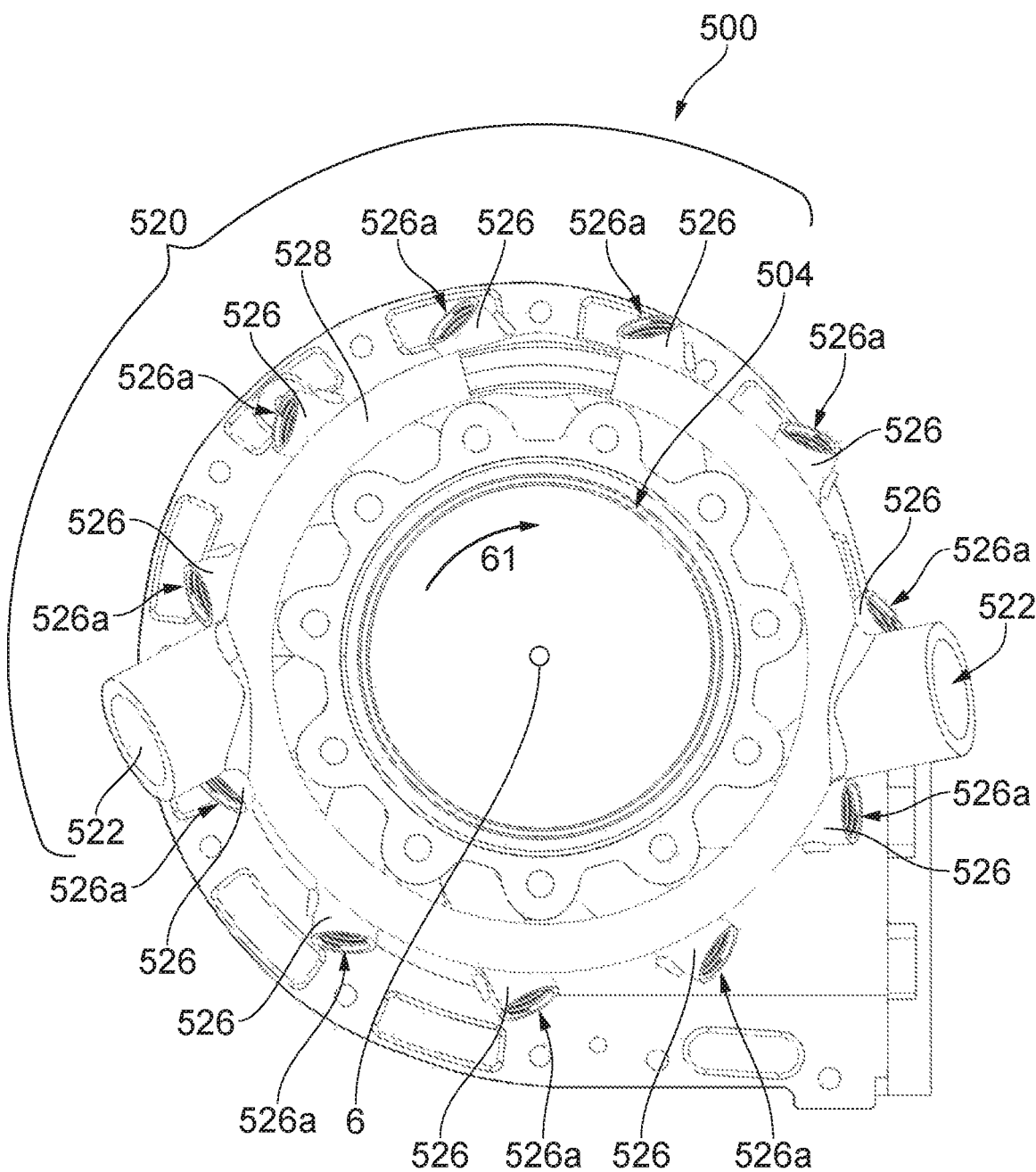
Figure 25:
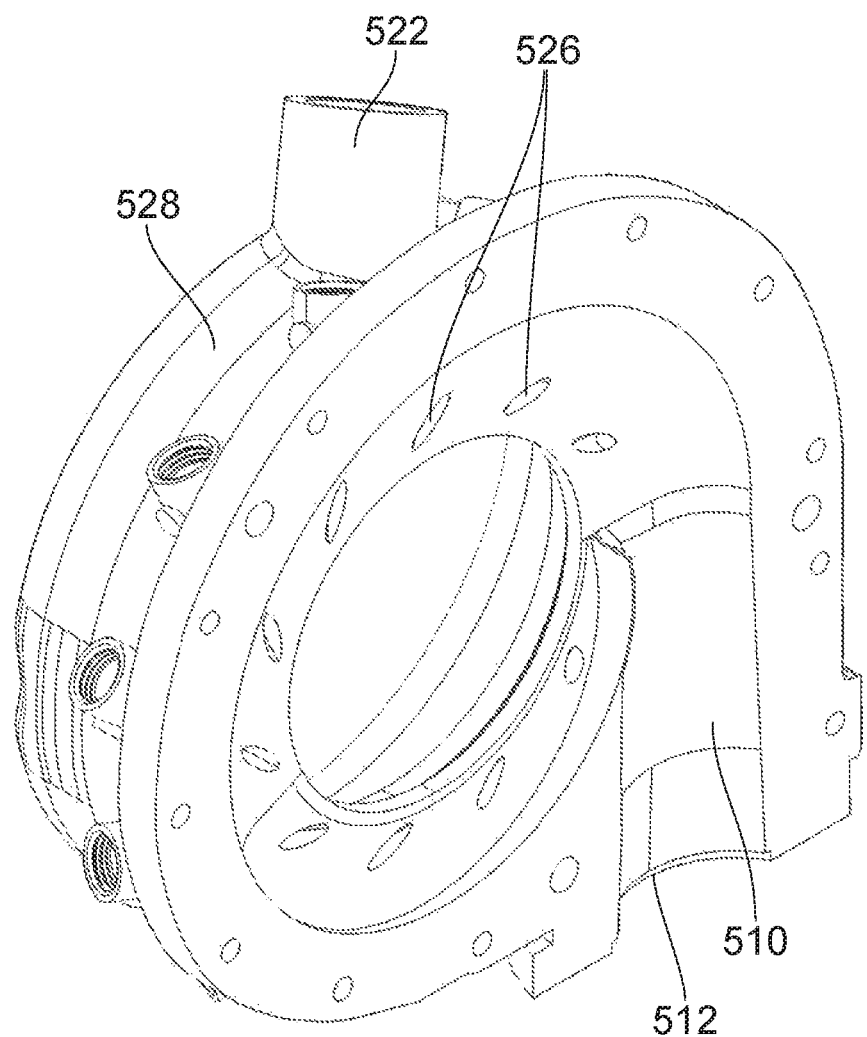
Figure 26:
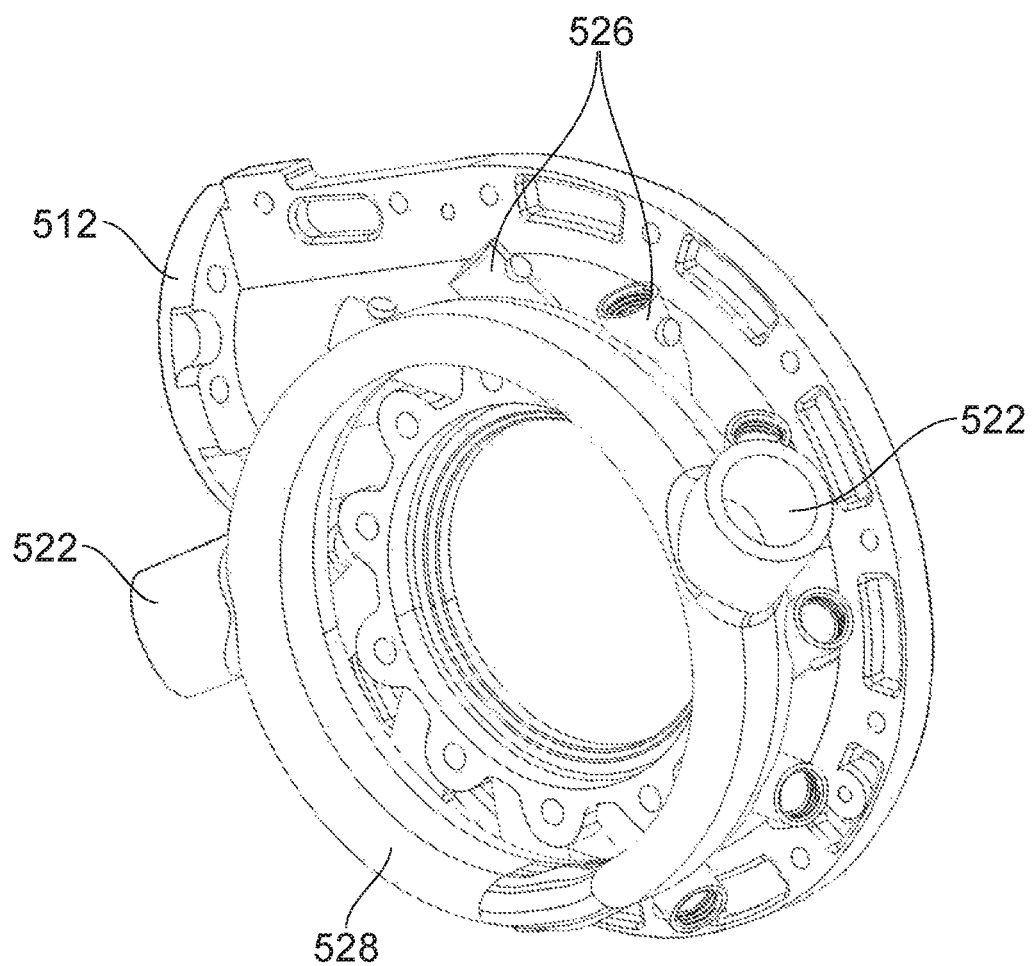

FIGS. 23 to 26 show an example of part of a casing 500 for a turbine rotor 2 enabling the turbine rotor to be driven with first and second working fluids. FIGS. 23 and 24 show plan views of the casing when viewed from opposing sides, while FIGS. 25 and 26 show corresponding views of the casing in perspective. The casing 500 may be used with any conventional turbine rotor, for example the radial flow turbine rotor 2 illustrated in FIGS. 1 and 2.

The casing 500 comprises a first fluid supply channel 510 to direct a first working fluid (supplied into the casing at a first working fluid inlet 512) onto the turbine rotor 2 (not shown) such that the first working fluid imparts torque onto the turbine rotor 2 in a given direction 61. The casing 500 also comprises a second fluid supply channel 520 to direct a second working fluid (supplied into the casing at one or more second working fluid inlets 522) onto the rotor 2 to impart torque on the turbine rotor 2 in the same direction 61 as the direction in which torque is imparted on the turbine rotor 2 by the first working fluid. The second fluid supply channel 520 is indicated in FIG. 24 as encompassing the annulus 528 and fluid guiding structures (nozzles) 526 discussed below—while only a subset of the fluid guiding structures 526 are marked as 520 in FIG. 24 for conciseness, it will be appreciated that each of the fluid guiding structures 526 may be considered to be part of the second fluid supply channel 520. The first fluid supply channel 510 and the second fluid supply channel 520 are arranged to direct the first working fluid and the second working fluid from separate inlets 512, 522 to the casing 500 to form a cofluent flow of first working fluid and second working fluid to be directed onto a set of turbine blades 4 of the turbine rotor 2.

As described above, the first and second working fluids could be any fluid. For example, the fluids could be a gas, mixture of gases, liquid or mixture of liquids. For example, the fluids could be water, steam, exhaust gases from a heat engine, etc. The first and second working fluids can be of different types (e.g. exhaust gas and steam), or could be the same type of fluid but provided from two different sources (e.g. at different pressures or temperatures). Hence, in general the first and second working fluids may be any two different flows of fluid provided separately to respective inlet regions of the rotor. In one example, the first working fluid is an exhaust gas and the second working fluid is steam, for example steam heated by extracting heat from the exhaust gas (or by extracting heat from a further gas other than the exhaust gas) prior to supplying the steam onto the turbine rotor.

The term "co-fluent" will be understood to mean that the first working fluid and the second working fluid flow together. That is, the first working fluid and the second working fluid converge to meet at one or more points within the casing prior to being imparted onto the set of turbine blades, thereby allowing the two fluids to flow together onto the set of turbine blades. This may cause the two fluids to at least partially mix prior to being imparted onto the set of turbine blades and may cause the two fluids to be confluent. It will be appreciated in the present example that the first and the second working fluids are fed into the casing at separate inlets 512, 522 and are therefore not considered to be co-fluent when they enter the casing in the first fluid supply channel 510 and the second fluid supply channel 520 respectively. The first fluid supply channel 510 and the second fluid supply channel 520 are then arranged to form a co-fluent flow of first working fluid and second working fluid to be imparted onto a set of turbine blades 4 of the turbine rotor 2. For example, the second fluid supply channel 520 may expel the second working fluid into the first fluid supply channel 510, prior to the co-fluent flow of first and second working fluid being supplied from an outlet of the first fluid supply channel 510 onto the rotor 2.

As shown in FIG. 23, the first fluid supply channel 510 forms a circumferential portion 514 extending around an internal surface 504 of the casing 500 corresponding to the circumference of the turbine rotor 2. The first fluid supply channel 510 and the second fluid supply channel 520 may cause the first working fluid and the second working fluid to be co-fluent within the circumferential portion 514 of the first fluid supply channel 510 for distributing the first working fluid or the second working fluid about the circumference of the turbine rotor. The co-fluent flow of first working fluid and second working fluid then passes over the internal surface 504 of the casing 500 and is imparted onto the turbine blades 4 of the turbine rotor 6.

The casing 500 is formed in two parts, only one of which is shown in FIGS. 23-26 to allow the internal passageways within the casing to be visible. The front plate of the casing 500 shown in FIGS. 23 to 26 forms part of the boundary of the first fluid supply channel 510, with the casing 500 also comprising a back plate with a central hole for the rotor and shaft and an internal cavity forming the other portion of the first fluid supply channel, where the internal cavity of the back plate has a corresponding shape to the circumferential portion 514 of the first fluid supply channel 510 shown in FIGS. 23 and 25 so as to enclose the first fluid supply channel 510 between the front/back plates. The front plate shown in FIGS. 23 to 26 is designed to be provided on the upstream side of the turbine rotor, and the back plate on the downstream side (where downstream refers to the side closest to the exhaust outlet 18 of the turbine rotor at which the fluids are expelled from the rotor, and upstream refers to the other side when viewed along the axis of the rotor).

The second fluid is supplied into the casing at two second fluid inlets 522 (provided at different circumferential positions about the axis) which are connected to an annulus 528 which is offset in axial position from the circumferential portion 514 of the first fluid supply channel 510. The annulus 528 creates a balanced distribution of the second working fluid and therefore ensures that the flow of the second fluid through each of the nozzles 526 is at a similar pressure and mass flow. In this example, the annulus 528 is positioned upstream of the first fluid supply channel 510 (i.e. on the opposite side from the side where the first/second fluids are exhausted from the turbine rotor), but other examples could provide the annulus 528 downstream of the first fluid supply channel. The annulus 528 may be offset from the nozzles 526 along the axis 6 of the turbine rotor 2. In the example in FIGS. 23 and 24 the annulus 528 is offset from the nozzles 526 such that the nozzles 526 are formed between the annulus 528 and the first fluid supply channel 510. Although in the example illustrated in FIGS. 23 and 24 there are two inlets 522 of the second fluid supply channel 520 this is not essential. For example, the second fluid supply channel 520 may comprise a single inlet 522 or may comprise more than 2 inlets, for example four. Additionally, although the inlets 522 in FIGS. 23 and 24 are illustrated as being diametrically opposite each other such that the inlets 522 are evenly distributed around the circumference, this is not essential.

The second fluid supply channel comprises a plurality of the fluid guiding structures 526 circumferentially disposed around the axis 6 of the turbine rotor 2. Holes in the base of the annulus 528 allow the second working fluid to flow from the annulus 528 into each individual nozzle 526. The fluid guiding structures may comprise nozzles, ducts, tubes, conduit or any other suitable structure for guiding a fluid. FIGS. 23 and 24 show 11 nozzles 526 evenly disposed circumferentially around the axis 6, which supply the second working fluid within the circumferential portion 514 of the first fluid supply channel 510, in other words to expel the second working fluid into the first fluid supply channel 510. Although 11 nozzles 526 are illustrated, it will be appreciated that fewer or more fluid guiding structures 526 may be provided, for example 2, 8 or 25. Equally, it will be appreciated that it is not essential for the nozzles 526 to be evenly disposed circumferentially around the axis 6. For example, nozzles may be grouped at a particular circumferential location, such as where the first fluid supply channel 510 opens into the circumferential portion 514 and fewer nozzles may be provided at the circumferential positon opposite this point.

As illustrated in FIG. 23, the nozzles 526 may be orientated at an angle to the radius of the rotor 2, for example inclined so that an outlet of each nozzle 526 points in the direction 61 in which torque is imparted on the turbine rotor 2 by the working fluid (and therefore the direction of rotation of the turbine rotor). The nozzles may be orientated such that the second working fluid exits the nozzles substantially perpendicular to the rotor blades, therefore ensuring there is little or no cross flow component to the second working fluid when it is imparted onto the turbine rotor. In this example, the nozzles 526 have a circular internal cross-section. Note that while the nozzle outlets 526 appear elongated in FIG. 23 due to the curvature of the inner surface of the first fluid supply channel 510, which means that one side of the nozzle cross-section reaches the inner surface of the first fluid supply channel 510 earlier than the other side of the nozzle cross-section, the internal cross-section of the nozzles 526 is nevertheless circular. However, a circular cross-section is not essential. For example the nozzles 526 may have a square or hexagonal cross-section.

Figure 27:
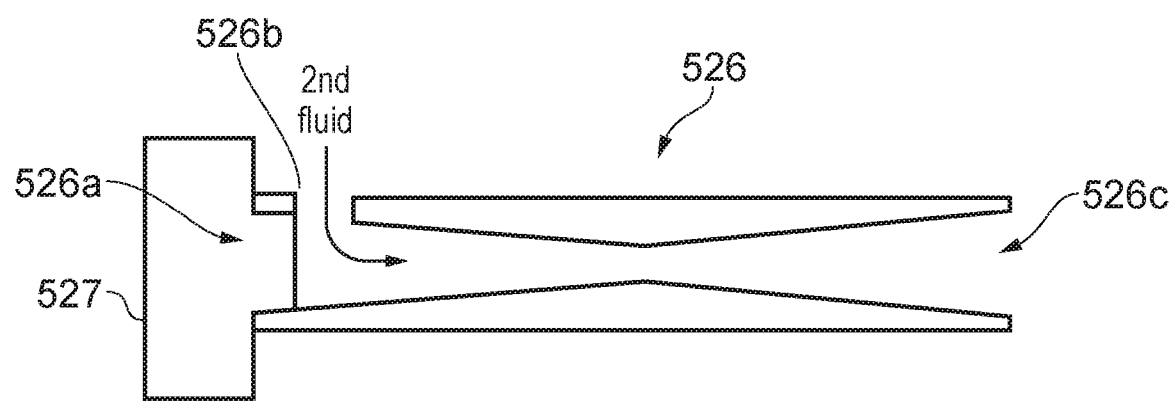
FIG. 27 shows a cross section of a nozzle.

FIG. 27 shows an example cross section of a nozzle 526. The second working fluid passes from the annulus 528 into the nozzle 526 through a nozzle inlet 526b, along the nozzle 526 and out of the nozzle exit 526c. As illustrated in FIG. 25, the nozzles 526 may comprise convergent-divergent (de Laval) nozzles. That is, an internal diameter of the nozzle at a midpoint of the nozzle may be narrower than an internal diameter of the nozzle at the nozzle inlet 526b or nozzle exit 526c. Alternatively, the nozzles 526 may be convergent nozzles (with the internal diameter of the nozzle narrower at the nozzle exit 526c than at the nozzle inlet 526b). With a convergent-divergent or convergent nozzle, the second working fluid will therefore accelerate as it passes through the nozzles 526. Although each of the nozzles 526 in FIG. 23 are the same, it will be appreciated that different nozzles may take different forms, for example having different cross sections, critical flow rates and inclination angles whilst forming part of the same second fluid supply channel.

At least one of the nozzles 526 may further comprise a metering device, such as a valve, a restrictor or other means of controlling the mass flow of the second working fluid through the nozzle 526. The metering device may pulse the flow of the second working fluid, for example to synchronise the pulse of the flow of the second working fluid with the rotation of the turbine blade. For example, the metering device could be configured to match the frequency at which the flow of the second working fluid is pulsed with the blade passing frequency of the rotor blades 4. If the metering device is a valve, the valve could comprise a controller to control the opening and closing of the valve relative to the shaft speed of the turbine, since the turbine has a predetermined number of blades 4 and therefore the blade passing frequency can be derived from the shaft speed. Alternatively, the metering device could comprise a plate with a number of holes in it at the same radial location as the exit 526c of the nozzles 526. When a hole aligns with an exit 526c of a nozzle 526, the second working fluid can flow out of the exit 526c of the nozzle 526 and through hole in the plate and onto the rotor. When a hole is not aligned with the exit 526c of the nozzle 526, the exit 526c of the nozzle 526 is blocked and the second working fluid can not exit the nozzle 526. During use of the rotor, the plate may rotate such that the exits 526c of the nozzles 526 are blocked and unblocked as the holes in the plate pass the exits 526c of the nozzles 526, creating a pulsed flow out of the nozzles. The number of holes in the plate may be the same as the number of nozzles, but this is not essential. Equally, the plate could rotate at the same rotational speed as the rotor 2, but this is also not essential. The frequency of at which the flow of the second working fluid is pulsed could match the blade passing frequency or be a multiple of the blade passing frequency, for example 0.5, 2 or 4. In the case of the valve, this can be achieved by actuating the valve at the required frequency. In the case of the rotating plate, this can be achieved by altering the rotational speed of the plate.

The nozzles 526 may be formed integrally with the casing 500 or may form separate parts to the casing 500. For example, each of the plurality of fluid guiding structures may comprise an orifice 526a into which a separate nozzle can be inserted. In the example illustrated in FIG. 24, the orifice 526a is threaded so that a nozzle can be inserted into the orifice 526a and secured in place, for example using an end cap 527 on the orifice 526a. The end cap 527 may serve to seal the orifice 526a to prevent the second working fluid from leaking out of the orifice 526a. Alternatively, when the nozzles 526 are formed integrally with the casing 500 (e.g. by additive manufacture), the end caps 527 can also be formed integrally with the casing 500. Although having the nozzles 526 as separate parts increases the part count for the casing 500 and the cost and time required to assemble the casing, it allows nozzles 526 to be removed and replaced. For example a nozzle 526 may become blocked and require changing, or nozzles 526 with different operating pressures or mass flows could be swapped in and out of the casing 500 depending on a specific application of the turbine.

Figure 28:
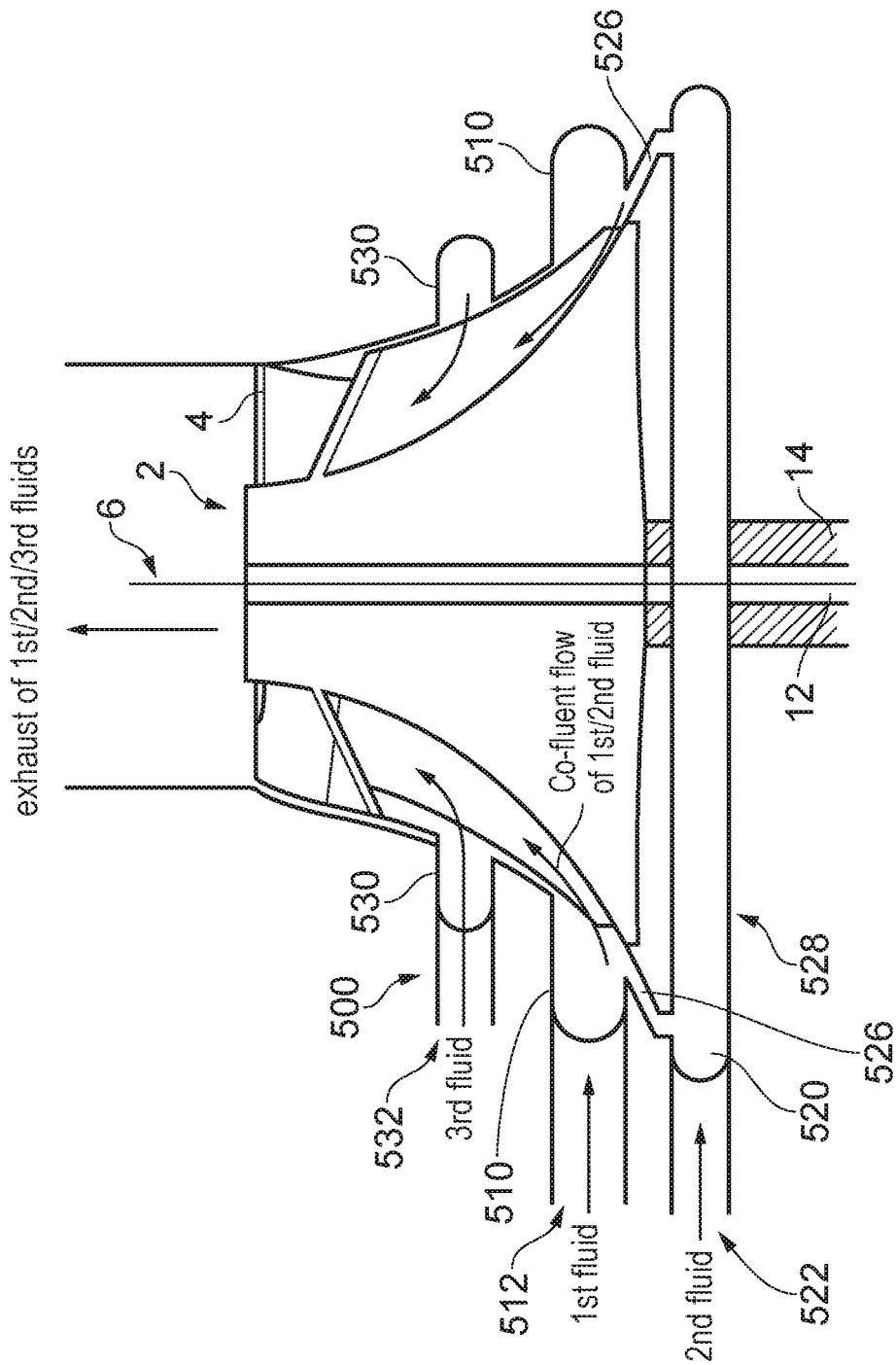
FIG. 28 shows a cross section of a turbine comprising the casing and the turbine rotor.

FIG. 28 shows a cross section of a turbine comprising the casing 500 and the rotor 2. As shown in FIG. 28, the first and second working fluids may be supplied into the casing at separate inlets 512, 522 and then the second working fluid may enter the annulus 528 and pass through nozzles 526 into the first fluid supply channel 510, to form a co-fluent flow of first and second working fluid which is imparted onto the blades 4 of the rotor 2 to impart torque on the rotor.

Optionally, the casing may also comprise a third fluid supply channel 530 may direct a third working fluid onto the turbine rotor 2 to impart torque on the turbine rotor in the same direction as the direction in which torque is imparted on the turbine rotor by the first working fluid and the second working fluid, as shown in the example of FIG. 28. It will be appreciated that the source of third fluid may be optional and can be omitted in other embodiments. The third working fluid may be the same as the first working fluid or the second working fluid, or may be a separate further separate fluid. For example, the third fluid may be the same type of fluid and in the same state as the second working fluid, such as steam, water or air, but at a different temperature and/or pressure. As illustrated in FIG. 28, the third working fluid may be directed into the casing 500 at an inlet 532 to the third fluid supply channel 530 which is separate from both the first fluid supply channel 510 and the second fluid supply channel 520. Alternatively, the third fluid supply channel 530 may share a common inlet with either the first fluid supply channel 510 or the second fluid supply channel 520 but may impart the third working fluid onto the rotor 2 at a different location to both the first working fluid and the second working fluid. For example, the third fluid supply channel 530 may be a branch off the annulus 528 of the second fluid supply channel 520.

In the example of FIG. 28, the third fluid supply channel 530 may direct a flow of third working fluid onto the set of turbine blades 4 of the turbine rotor 2, where the flow of third working fluid is non-co-fluent with the co-fluent flow of first and second working fluid at the point where the first/second working fluid encounters the blades 4. As illustrated in FIG. 28, an outlet of the third fluid supply channel is at a different location along the axis 6 of the turbine rotor 2 to the outlet of the first fluid supply channel and the second fluid supply channel. In other words, the third working fluid is supplied onto the rotor at a different axial location to the first working fluid and the second working fluid. The co-fluent flow of first working fluid and second working fluid passes over the internal surface 504 of the casing 500 and is imparted onto the turbine blades 4 of the turbine rotor 2, whilst the third working fluid exits the third fluid supply channel 530 at a different axial location where it is combined with the co-fluent flow of first/second working fluid after the first/second working fluid has already been imparted onto the blades. For example, the third fluid supply channel 530 could be formed similar to a conventional volute for directing fluid onto a rotor, and could be formed integrally with the casing comprising the first/second fluid flow channels, or as a separate component.

In an alternative embodiment, first, second and third fluid supply channels may be arranged to direct the first, second and third working fluids from separate inlets to the casing to form a co-fluent flow of first, second and third working fluid to be imparted onto a set of turbine blades of the turbine rotor. For example, a further annulus similar to the annulus used for the second working fluid could be formed in the casing, connected to a number of third fluid guiding structures (nozzles) circumferentially disposed around an axis of the turbine rotor in a similar way to the third fluid guiding structures (nozzles) used for injecting the second working fluid into the first fluid supply channel. The second and third fluid guiding structures may be interleaved about the circumference of the axis of the turbine rotor. The second fluid guiding structures and the third fluid guiding structures may be at the same axial position along the axis of the turbine rotor. For example, the second and third fluid guiding structures may alternate in position about the circumference of the axis of the turbine rotor (e.g. second, third, second, third, etc.). It will be appreciated that it is not essential for there to be the same number of second and third fluid guiding structures, or that they are interleaved in a rotationally symmetric pattern. With this approach, a co-fluent flow can be formed within the casing from three different sources of working fluid, with the co-fluent flow of all three fluids being directed onto the turbine rotor in at the same radial/axial position.

Regardless of whether the third working fluid is introduced co-fluently with the first/second working fluids, or at a downstream location as shown in the example of FIG. 28, it will be appreciated that these techniques could be extended to introduce a fourth working fluid or further fluids. Hence, more than three fluid supply channels, for example 4, 6 or 8 fluid supply channels, may be provided and configured as described above to provide a co-fluent flow of multiple working fluids to be imparted onto a set of turbine blades of the turbine rotor 2, or to provide a flow where at least the first/second working fluids are provided co-fluently onto the rotor but third, fourth or further working fluids may be provided at axially offset locations as a non-co-fluent flow onto the rotor.

A turbine comprising the casing 500 described above and a conventional rotor (such as the rotor shown in FIGS. 1 and 2) can be used as the gas/steam turbine 208 in the system of FIG. 20 described above. The casing 500 can be made using additive manufacture as described with reference to FIGS. 21 and 22 (except that for the casing, the design file at step 400 of FIG. 22 would define at least a portion of the casing having the first/second fluid supply channels discussed above, and the manufacturing step 404 would manufacture that portion of the casing instead of manufacturing the rotor as described in FIG. 22). Hence, the portion of the casing shown in FIGS. 23 to 26 can be formed as an integrated mass of consolidated material.

Figure 29:
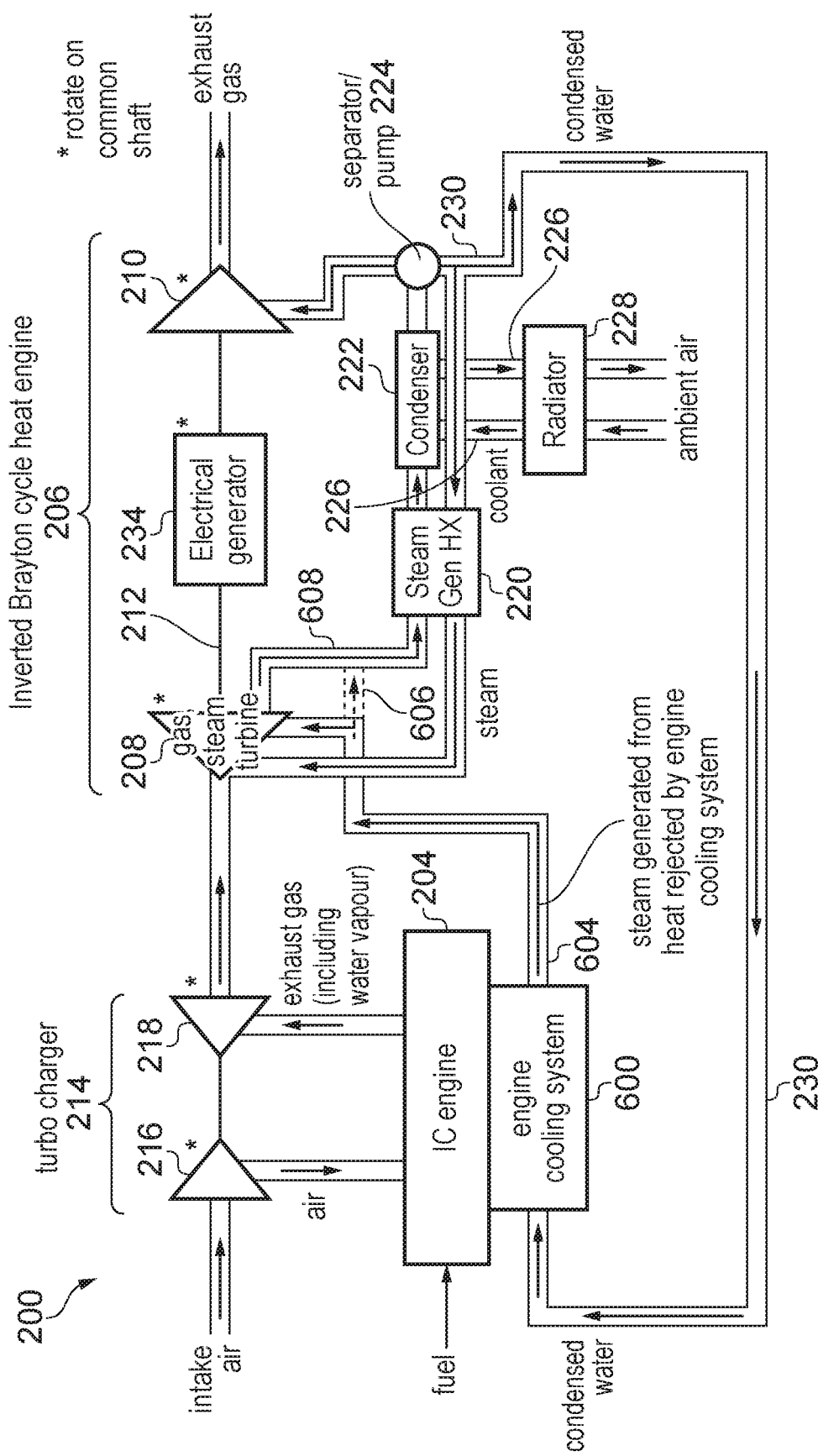
FIG. 29 shows another example of an apparatus in which a single turbine rotor is driven by at least two working fluids.

FIG. 29 shows another example of a system that can use the turbine with the casing 500 discussed above. The system of FIG. 29 includes the same components as in FIG. 20, but also comprises an engine cooling system 600 for cooling the internal combustion engine 204. For example, the engine cooling system 600 may comprise a heat exchanger where the coolant circulated through the engine 204 exchanges heat with a separate flow of condensed water 230 from the separator/pump 224 before the coolant is returned to the engine 204. Hence, heat passes from the coolant to the condensed water 230 within the engine cooling system 600, to form a secondary heated flow 604 which may create steam from which some additional energy can be recovered to improve efficiency of the overall system. The secondary heated flow 604 can be supplied to the gas/steam turbine 208 as a third working fluid, which can be introduced in the third fluid supply channel as discussed above with respect to FIG. 28, to enable a single rotor to extract work from the exhaust gas from the internal combustion engine 204 as the first working fluid, steam from the steam generating heat exchanger 220 as the second working fluid, and the secondary heated flow 604 as a third working fluid.

Alternatively, in some examples rather than introducing the secondary heated flow 604 as a third working fluid at the gas/steam turbine 208, instead the secondary heated flow 604 could pass through a bypass channel 606 shown in dotted lines in FIG. 29 to expel the secondary heated flow 604 into a downstream channel 608 passing between the gas/steam turbine 208 and the steam generating heat exchanger 220 or a portion of it. In some embodiments, an ejector may be provided at the point of the downstream channel 608 at which the secondary heated flow 604 is introduced. An ejector is a device using a smaller, high-speed, jet of fluid with relatively low volume flow rate to move fluid at much larger volume flow rates against a pressure differential. For example, the downstream channel can include a constriction and the heated air may pass through a narrower passage so that it is injected upstream of the constriction with a smaller volume flow rate but higher velocity than the exhaust gas/steam received from the steam generating heat exchanger. The ejector acts as a pump by using the high speed jet of secondary heated flow 604 to entrain (drag along) the surrounding fluid. This approach can be useful for embodiments where the pressure of the secondary heated flow 604 from the cooling system 600 is such that introducing it at the gas/steam turbine 208 would reduce efficiency with which torque can be extracted from the exhaust gas/steam.

Further example arrangements are set out in the following numbered clauses:

(1) A turbine rotor comprising:
 a set of turbine blades shaped to impart torque on the turbine rotor in a predetermined direction when a first working fluid flows from a first fluid inlet portion along first fluid flow channels between the turbine blades; and
 one or more second fluid guiding structures on the same rotor as the turbine blades, defining one or more second fluid flow channels having a different geometry to the first fluid flow channels, and shaped to impart torque on the turbine rotor in said predetermined direction when a second working fluid flows from a second fluid inlet portion separate from the first fluid inlet portion along said one or more second fluid flow channels.

(2) The turbine rotor according to clause (1), wherein at least part of the second fluid flow channels is disposed radially inwards or outwards from, and at the same axial position, as at least part of the first fluid flow channels.

(3) The turbine rotor according to any of clauses (1) and (2), comprising a common exhaust region to exhaust both the first working fluid from the first fluid flow channels and the second working fluid from the second fluid flow channels.

(4) The turbine rotor according to any preceding clause, wherein the second fluid guiding structures comprise a further set of turbine blades disposed radially inward or outward from said set of turbine blades.

(5) The turbine rotor according to clause (4), wherein the set of turbine blades comprises radial flow turbine blades, and the further set of turbine blades comprises radial flow turbine blades.

(6) The turbine rotor according to any of clauses (4) and (5), wherein the set of turbine blades comprises radial flow turbine blades, and the further set of turbine blades comprises rotating axial flow turbine blades disposed radially inward from the set of turbine blades.

(7) A turbine comprising: the turbine rotor according to clause (6); and a stator comprising static axial flow turbine blades for forming an axial flow turbine with said rotating axial flow turbine blades of said turbine rotor.

(8) The turbine rotor according to any of clauses (1) to (3), wherein the second fluid guiding structures comprise boundaries of one or more reaction-wheel channels to expel the second working fluid in a direction opposite to said predetermined direction, to impart torque on said turbine rotor in said predetermined direction.

(9) The turbine rotor according to clause (8), wherein the reaction-wheel channels are formed within said set of turbine blades.

(10) The turbine rotor according to any of clauses (8) and (9), wherein the reaction-wheel channels are configured to expel the second working fluid into the first fluid flow channels.

(11) The turbine rotor according to any of clauses (8) and (9) wherein the first fluid flow channels are shrouded by a shroud portion fixed to the turbine rotor, and the reaction-wheel channels are configured to expel the second working fluid to a region outside the shroud portion of the set of turbine blades.

(12) The turbine rotor according to any preceding clause, wherein the turbine rotor comprises an integrated mass of consolidated material.

(13) An apparatus comprising: a turbine comprising the turbine rotor according to any of clauses (1) to (6) and (8) to (12) or the turbine according to clause (7); a first fluid supply portion to supply the first working fluid to the first fluid inlet portion of the turbine rotor; a second fluid supply portion to supply the second working fluid to the second fluid inlet portion of the turbine rotor; and a common exhaust portion to output both the first working fluid and the second working fluid expelled from the turbine.

(14) The apparatus according to clause (13), wherein the first fluid supply portion comprises a first volute to inject the first working fluid at regions disposed around the circumference of the turbine rotor.

(15) The apparatus according to any of clauses (13) and (14), wherein the second fluid supply portion comprises a second volute to inject the second working fluid into the second fluid flow channels at regions disposed around the circumference of the turbine rotor.

(16) The apparatus according to any of clauses (13) and (14), wherein the second fluid supply portion is configured to inject the second working fluid along an axis of the turbine rotor into the one or more second fluid flow channels.

(17) The apparatus according to any of clauses (13) to (16), wherein the first fluid supply portion is configured to supply gas as the first working fluid, and the second fluid supply portion is configured to supply steam as the second working fluid.

(18) An apparatus comprising:
a plurality of heat engines comprising: at least one heat engine to combust a fuel and generate exhaust gas comprising water as a combustion product; and an inverted Brayton cycle heat engine comprising an inverted-Brayton-cycle turbine driven by said exhaust gas, and an inverted-Brayton-cycle compressor driven by said inverted-Brayton-cycle turbine to receive and to compress said exhaust gas from said Inverted-Brayton-cycle turbine;
a condenser located in a fluid path of said exhaust gas between said inverted-Brayton- cycle turbine and said inverted-Brayton-cycle compressor to condense at least some of said water from said exhaust gas to form condensed water; and
a steam-generating heat exchanger to receive the condensed water from said condenser and to transfer heat to said condensed water to generate steam;
wherein said inverted-Brayton-cycle turbine comprises the turbine rotor according to any of clauses (1) to (6) and (8) to (12) or the turbine according to clause (7), wherein said first working fluid comprises said exhaust gas and said second working fluid comprises said steam generated by the steam-generating heat exchanger.

(19) A method of manufacturing a turbine rotor, comprising forming the turbine rotor comprising: a set of turbine blades shaped to impart torque on the turbine rotor in a predetermined direction when a first working fluid flows from a first fluid inlet portion along first fluid flow channels between the turbine blades; and one or more second fluid guiding structures on the same rotor as the turbine blades, defining one or more second fluid flow channels having a different geometry to the first fluid flow channels, and shaped to impart torque on the turbine rotor in said predetermined direction when a second working fluid flows from a second fluid inlet portion separate from the first fluid inlet portion along said one or more second fluid flow channels.

(20) The method of clause (19), wherein the turbine rotor is manufactured by additive manufacture.

(21) The method of any of clauses (19) and (20) wherein the turbine rotor is manufactured as an integrated mass of consolidated material.

(22) A computer-readable data structure representing a design of a turbine rotor according to any of clauses (1) to (6) and (8) to (11).

(23) A computer-readable storage medium storing the data structure of clause (22).

(24) An energy recovery system for recovering energy from a first working fluid; comprising: a turbine rotor to extract mechanical work from the first working fluid; a heater to heat a second working fluid based on heat extracted from the first working fluid or a further fluid prior to supplying the second working fluid to the turbine rotor; and at least one supply channel to supply the second working fluid heated by the heater to the turbine rotor, such that both the first working fluid and the second working fluid impart torque on the same turbine rotor in the same direction.

(25) The energy recovery system according to clause (24), wherein the turbine rotor forms part of a turbine, wherein the turbine rotor comprises a set of turbine blades shaped to impart torque on the turbine rotor in a predetermined direction when the first working fluid flows from a first fluid inlet portion along first fluid flow channels between the turbine blades; and wherein the at least one supply channel comprises one or more second fluid guiding structures defining one or more second fluid flow channels having a different geometry to the first fluid flow channels, and shaped to impart torque on the turbine rotor in said predetermined direction when the second working fluid flows from a second fluid inlet portion separate from the first fluid inlet portion along said one or more second fluid flow channels.

(26) The energy recovery system according to clause (25), wherein the one or more second fluid guiding structures are at the same radial and axial position as at least part of the first fluid inlet portion with respect to an axis of the turbine rotor.

(27) The energy recovery system according to clause (25) or clause (26), wherein the one or more second fluid guiding structures are formed on a casing, the casing at least partially surrounding the turbine rotor.

(28) The energy recovery system according to clause (27), wherein the one or more second fluid guiding structures comprise nozzles.

(29) The energy recovery system according to clause (28), wherein the one or more nozzles are configured to expel the second working fluid in said predetermined direction, to impart torque on said turbine rotor in said predetermined direction.

(30) The energy recovery system according to clause (28) or (29), wherein the one or more nozzles are circumferentially disposed around an axis of the turbine rotor.

(31) The energy recovery system according to any of clauses (28) to (30), wherein the second fluid inlet portion comprises an annulus formed on the casing around an axis of the turbine rotor, the annulus configured to direct the second working fluid into each of the one or more nozzles.

(32) The energy recovery system according to clause (31), wherein the annulus is offset from each of the one or more nozzles along the axis of the turbine rotor.

(33) The energy recovery system according to any of clauses (28) to (32), wherein the one or more nozzles comprise convergent-divergent nozzles.

(34) The energy recovery system according to any of clauses (28) to (33), wherein at least one of the nozzles further comprises a metering device configured to control a flow rate of the second working fluid.

(35) The energy recovery system according to clause (34), wherein the metering device is configured to pulse the flow of the second working fluid.

(36) The energy recovery system according to clause (35), wherein the metering device is configured to synchronise the pulse of the flow of the second working fluid with a rotation of the turbine rotor.

(37) The energy recovery system according to any of clauses (25) to (36), wherein the set of turbine blades comprises radial flow turbine blades.

(38) The energy recovery system according to clause (25), where the one or more second fluid guiding structures are on the same turbine rotor as the turbine blades.

(39) The energy recovery system according to clause (38) wherein at least part of the second fluid flow channels is disposed radially inwards or outwards from, and at the same axial position, as at least part of the first fluid flow channels.

(40) The energy recovery system according to clause (38) or (39), wherein the second fluid guiding structures comprise a further set of turbine blades disposed radially inward or outward from said set of turbine blades.

(41) The energy recovery system according to clause (40), wherein the set of turbine blades comprises radial flow turbine blades, and the further set of turbine blades comprises radial flow turbine blades.

(42) The energy recovery system according to clause (40), wherein the set of turbine blades comprises radial flow turbine blades, and the further set of turbine blades comprises rotating axial flow turbine blades disposed radially inward from the set of turbine blades.

(43) The energy recovery system according to clause (42), further comprising:
a stator comprising static axial flow turbine blades for forming an axial flow turbine with said rotating axial flow turbine blades of said turbine rotor.

(44) The energy recovery system according to any of clauses (25) to (43), further comprising a common exhaust region to exhaust both the first working fluid from the first fluid flow channels and the second working fluid from the second fluid flow channels.

(45) The energy recovery system according to any of clauses (25) to (44), wherein the first fluid flow channels are shrouded by a shroud portion fixed to the turbine rotor.

(46) The energy recovery system according to any of clauses (25) to (45), further comprising: a first fluid supply portion to supply the first working fluid to the first fluid inlet portion of the turbine rotor; a second fluid supply portion to supply the second working fluid to the second fluid inlet portion of the turbine rotor; and a common exhaust portion to output both the first working fluid and the second working fluid expelled from the turbine.

(47) The energy recovery system according to clause (46), wherein the first fluid supply portion comprises a first volute to inject the first working fluid at regions disposed around the circumference of the turbine rotor.

(48) The energy recovery system according to clause (46) or (47), wherein the second fluid supply portion comprises a second volute to inject the second working fluid into the second fluid flow channels at regions disposed around the circumference of the turbine rotor.

(49) The energy recovery system according to clause (46) or (47), wherein the second fluid supply portion is configured to inject the second working fluid along an axis of the turbine rotor into the one or more second fluid flow channels.

(50) The energy recovery system according to any of clauses (24) to (49), wherein the first working fluid comprises gas, and the second working fluid comprises steam.

(51) The energy recovery system according to any of clauses (24) to (50), wherein the turbine rotor comprises an integrated mass of consolidated material.

(52) The energy recovery system according to any of clauses (24) to (51), further comprising:
a plurality of heat engines comprising: at least one heat engine to combust a fuel and generate exhaust gas comprising water as a combustion product; and an inverted Brayton cycle heat engine comprising an inverted-Brayton-cycle turbine comprising said turbine rotor driven by said exhaust gas, and an inverted Brayton-cycle compressor driven by said inverted-Brayton-cycle turbine to receive and to compress said exhaust gas from said Inverted-Brayton-cycle turbine;
a condenser located in a fluid path of said exhaust gas between said inverted-Brayton-cycle turbine and said inverted-Brayton-cycle compressor to condense at least some of said water from said exhaust gas to form condensed water;
wherein said heater comprises a steam-generating heat exchanger to receive the condensed water from said condenser and to transfer heat to said condensed water to generate steam; and
said first working fluid comprises said exhaust gas and said second working fluid comprises said steam generated by the steam-generating heat exchanger.

(53) A computer-readable data structure representing a design of a turbine casing for a turbine rotor, the turbine casing comprising one or more nozzles defining one or more second fluid flow channels shaped to impart torque on a turbine rotor in a predetermined direction when a second working fluid flows from an annulus formed on the casing around an axis of the turbine rotor, the annulus configured to direct the second working fluid into each of the one or more nozzles.

(54) A computer-readable storage medium storing the data structure of clause (53).

(55) A system comprising: a source of first working fluid; a steam generator to generate steam as a second working fluid; and a turbine comprising a turbine rotor and a turbine casing, in which the turbine casing comprises separate inlets for the first working fluid and the second working fluid and is configured to drive the same turbine rotor with both the first working fluid and the second working fluid to provide greater torque on the turbine rotor than if the turbine was driven by the first working fluid alone.

In the present application, the words "configured to . . . " are used to mean that an element of an apparatus has a configuration able to carry out the defined operation. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. A casing for a turbine rotor comprising:
a first fluid supply channel forming a circumferential portion extending around an internal surface of the casing and configured to direct a first working fluid onto the turbine rotor; and
a second fluid supply channel comprising a plurality of convergent-divergent nozzles circumferentially disposed around an axis of the turbine rotor and configured to direct a second working fluid into the circumferential portion of the first fluid supply channel to impart torque on the turbine rotor in the same direction as the direction in which torque is imparted on the turbine rotor by the first working fluid, wherein the first fluid supply channel and the second fluid supply channel are arranged to direct the first working fluid and the second working fluid from separate inlets to the casing such that the first working fluid and the second working fluid converge to meet at one or more points within the casing prior to being imparted onto the set of turbine blades, to form a co-fluent flow of first working fluid and second working fluid passing over the internal surface of the casing to be directed onto a set of turbine blades of the turbine rotor, wherein the plurality of convergent-divergent nozzles are threaded into the casing.

2. The casing according to claim 1, wherein the first and second fluid supply channels are configured to cause the first working fluid and the second working fluid to be co-fluent within theft circumferential portion of the first fluid supply channel for distributing the first working fluid about the circumference of the turbine rotor.

3. The casing according to claim 1, wherein the second fluid supply channel is configured to expel the second working fluid into the first fluid supply channel.

4. The casing according to claim 1, wherein the second fluid supply channel further comprises an annulus formed around an axis of the turbine rotor, the annulus configured to direct the second working fluid into each of the nozzles.

5. The casing according to claim 4, wherein the annulus is offset from the nozzles along the axis of the turbine rotor.

6. The casing according to claim 1, wherein at least one of the nozzles further comprises a metering device configured to control a flow rate of the second working fluid.

7. The casing according to claim 6, in which the metering device is configured to alter the area of a nozzle orifice.

8. The casing according to claim 6, wherein the metering device is configured to pulse the flow of the second working fluid.

9. The casing according to claim 8, wherein the metering device is configured to synchronise the pulse of the flow of the second working fluid with a rotation of the turbine rotor.

10. The casing according to claim 1, further comprising a third fluid supply channel configured to direct a third working fluid onto the turbine rotor to impart torque on the turbine rotor in the same direction as the direction in which torque is imparted on the turbine rotor by the first working fluid and the second working fluid.

11. The casing according to claim 10, wherein the first, second and third fluid supply channels are arranged to direct the first, second and third working fluids from separate inlets to the casing to form a co-fluent flow of first, second and third working fluid to be imparted onto a set of turbine blades of the turbine rotor.

12. The casing according to claim 10, in which the second fluid supply channel comprises a plurality of second fluid guiding structures circumferentially disposed around an axis of the turbine rotor; and
the third fluid supply channel comprises a plurality of third fluid guiding structures circumferentially disposed around an axis of the turbine rotor, wherein the second and third fluid guiding structures are interleaved about the circumference of the axis of the turbine rotor.

13. The casing according to claim 12, in which the second fluid guiding structures and the third fluid guiding structures are at the same axial position along the axis of the turbine rotor.

14. The casing according to claim 10, wherein the third fluid supply channel is configured to direct a flow of third working fluid onto the set of turbine blades of the turbine rotor, and said flow of third working fluid is non-co-fluent with the co-fluent flow of first and second working fluid at a point where the co-fluent flow of first and second working fluid first encounters the turbine blades of the turbine rotor.

15. The casing according to claim 10, wherein an outlet of the third fluid supply channel is at a different location along an axis of the turbine rotor to an outlet of the first fluid supply channel and the second fluid supply channel.

16. The casing according to claim 1, for use with a radial turbine.

17. A turbine comprising the casing according to claim 1, and the turbine rotor.

18. A system comprising:
the turbine of claim 17;
a source of primary fluid supplied to the turbine as the first working fluid; and
a steam generator to generate steam supplied as the second working fluid to the turbine.

19. The system according to claim 18, in which the system comprises an energy recovery system in which the steam generator is configured to heat water to generate the steam based on heat extracted from the primary fluid or a further fluid.

20. The system according to claim 18, in which the source of primary fluid comprises an internal combustion engine and the primary fluid comprises exhaust gas from the internal combustion engine.

21. An apparatus comprising:
a plurality of heat engines comprising:
at least one heat engine to combust a fuel and generate exhaust gas comprising water as a combustion product; and
an inverted Brayton cycle heat engine comprising an inverted-Brayton-cycle turbine driven by said exhaust gas, and an inverted Brayton-cycle compressor driven by said inverted-Brayton-cycle turbine to receive and to compress said exhaust gas from said Inverted-Brayton-cycle turbine;
a condenser located in a fluid path of said exhaust gas between said inverted-Brayton-cycle turbine and said inverted-Brayton-cycle compressor to condense at least some of said water from said exhaust gas to form condensed water; and
a steam-generating heat exchanger to receive the condensed water from said condenser and to transfer heat to said condensed water to generate steam;
wherein said inverted-Brayton-cycle turbine comprises the casing according to claim 1, said first working fluid comprises said exhaust gas and said second working fluid comprises said steam generated by the steam-generating heat exchanger.

22. A computer-readable storage medium storing a data structure representing a design of the casing of claim 1.

* * * * *

UNITED STATES PATENT AND TRADEMARK OFFICE
CERTIFICATE OF CORRECTION

PATENT NO. : 11,578,624 B2
APPLICATION NO. : 16/607231
DATED : February 14, 2023
INVENTOR(S) : Colin Douglas Copeland et al.

It is certified that error appears in the above-identified patent and that said Letters Patent is hereby corrected as shown below:

On the Title Page

Item (22) PCT Filed:
"Apr. 28, 2018" should read --Apr. 24, 2018--

Signed and Sealed this
Fourth Day of July, 2023

Katherine Kelly Vidal
*Director of the United States Patent and Trademark Office*